United States Patent [19]
Archer et al.

[11] Patent Number: 5,986,419
[45] Date of Patent: Nov. 16, 1999

[54] QUADRATURE AXIS WINDING FOR SENSORLESS ROTOR ANGULAR POSITION CONTROL OF SINGLE PHASE PERMANENT MAGNET MOTOR

[75] Inventors: William R. Archer; Roger C. Becerra; Brian L. Beifus; Mark A. Brattoli; David M. Erdman, all of Fort Wayne, Ind.; Thomas M. Jahns, Schenectady, N.Y.; Gerald B. Kliman, Niskayuna, N.Y.; Wen Liang Soong, Schenectady, N.Y.; Charles M. Stephens, Pattersonville, N.Y.; Eric R. Benedict; Michael W. Degner, both of Madison, Wis.

[73] Assignee: General Electric Company, Schenectady, N.Y.

[21] Appl. No.: 09/048,946

[22] Filed: Mar. 26, 1998

Related U.S. Application Data

[62] Division of application No. 08/680,010, Jul. 15, 1996, Pat. No. 5,796,194.

[51] Int. Cl.⁶ .................................................. H02K 23/00
[52] U.S. Cl. ......................... 318/254; 318/138; 318/439
[58] Field of Search .................................... 318/254, 138, 318/439, 723, 696

[56] References Cited

U.S. PATENT DOCUMENTS

| | | | |
|---|---|---|---|
| Re. 33,655 | 8/1991 | Hershberger | 68/23.7 |
| 2,474,647 | 6/1949 | Binney | 318/328 |
| 2,671,876 | 3/1954 | Spielberg et al. | 318/29 |
| 3,134,385 | 5/1964 | Cushing | 134/58 |
| 3,656,040 | 4/1972 | Babikyan | 318/168 |
| 3,908,130 | 9/1975 | Lafuze | 290/46 |
| 4,075,521 | 2/1978 | Nordebo | 310/184 |
| 4,080,543 | 3/1978 | Takahashi et al. | 310/213 |
| 4,109,170 | 8/1978 | Fujita et al. | 310/68 R |
| 4,313,076 | 1/1982 | Rathje | 318/790 |
| 4,346,335 | 8/1982 | McInnis | 318/351 |
| 4,359,657 | 11/1982 | Matsumoto et al. | 310/156 |

(List continued on next page.)

FOREIGN PATENT DOCUMENTS

| | | | |
|---|---|---|---|
| 54-057609 | 5/1979 | Japan | H02K 21/00 |
| 56-115164 | 2/1980 | Japan . | |
| 05103454 | 4/1993 | Japan | H02K 29/12 |
| 1734172 A1 | 5/1992 | U.S.S.R. . | |
| 1774439 A1 | 11/1992 | U.S.S.R. . | |
| 1 382 670 | 4/1972 | United Kingdom | H02K 24/00 |

OTHER PUBLICATIONS

M. Jufer "Back–EMF Indirect Detection for Self–Commutation of Synchronous Motors" European Power Electronics Conference, 1987, pp. 1125–1129.

*Primary Examiner*—Robert E. Nappi
*Assistant Examiner*—Rita Leykin
*Attorney, Agent, or Firm*—Senniger, Powers, Leavitt & Roedel; Damian Wasserbauer

[57] ABSTRACT

A single phase permanent magnet motor includes a rotor, a stator, and a quadrature axis winding positioned out-of-phase from a main winding of the stator for generating an output signal representative of rotor angular position. An integrator can be coupled to the quadrature axis winding for phase retarding the output signal, and a comparator can be coupled to the integrator for detecting zero crossings of the phase retarded output signal to provide a commutation signal. The quadrature axis winding can be positioned about ninety electrical degrees out-of-phase from the main winding of the stator, and the integrator can be adapted to phase retard the output signal by a number of degrees which decreases as a speed of the motor increases. At low speeds the phase retard is preferably at about ninety degrees so that the phase retarded signal becomes in-phase with the main stator winding back EMF voltage. The motor may further include a rectifier coupled to the quadrature axis winding for rectifying the output signal, and a lowpass filter for filtering the rectified output signal to provide a signal proportional to velocity. Also the single phase motor is commutated for maximum torque production.

14 Claims, 14 Drawing Sheets

U.S. PATENT DOCUMENTS

| | | | |
|---|---|---|---|
| 4,450,396 | 5/1984 | Thornton | 318/721 |
| 4,455,513 | 6/1984 | Fulton et al. | 318/138 |
| 4,481,440 | 11/1984 | Müller | 310/268 |
| 4,626,755 | 12/1986 | Butcher et al. | 318/473 |
| 4,635,349 | 1/1987 | Rabe | 29/596 |
| 4,642,537 | 2/1987 | Young | 318/254 |
| 4,658,162 | 4/1987 | Koyama et al. | 310/68 R |
| 4,665,331 | 5/1987 | Sudo et al. | 310/68 R |
| 4,668,884 | 5/1987 | Amao et al. | 310/68 R |
| 4,673,849 | 6/1987 | Sears et al. | 318/272 |
| 4,724,678 | 2/1988 | Pohl | 62/80 |
| 4,734,631 | 3/1988 | Kamikura et al. | 318/685 |
| 4,743,815 | 5/1988 | Gee et al. | 318/254 |
| 4,757,241 | 7/1988 | Young | 318/254 |
| 4,757,603 | 7/1988 | Stokes | 29/598 |
| 4,763,053 | 8/1988 | Rabe | 318/254 |
| 4,814,677 | 3/1989 | Plunkett | 318/254 |
| 4,973,869 | 11/1990 | Cho | 310/68 B |
| 5,023,527 | 6/1991 | Erdman et al. | 318/254 |
| 5,041,749 | 8/1991 | Gaser et al. | 310/156 |
| 5,070,264 | 12/1991 | Conrad | 310/68 B |
| 5,124,604 | 6/1992 | Swartz | 310/68 B |
| 5,140,243 | 8/1992 | Lyons et al. | 318/701 |
| 5,177,417 | 1/1993 | Lee et al. | 318/254 |
| 5,196,775 | 3/1993 | Harris et al. | 318/638 |
| 5,276,392 | 1/1994 | Beckerman | 318/751 |
| 5,300,884 | 4/1994 | Maestre | 324/207.25 |
| 5,321,342 | 6/1994 | Kruse | 318/254 |
| 5,329,195 | 7/1994 | Horber et al. | 310/68 B |
| 5,376,866 | 12/1994 | Erdman | 318/254 |
| 5,384,527 | 1/1995 | Rozman et al. | 322/10 |
| 5,406,155 | 4/1995 | Persson | 310/68 B |
| 5,418,438 | 5/1995 | Hollenbeck | 318/432 |
| 5,423,192 | 6/1995 | Young et al. | 62/228.4 |
| 5,440,219 | 8/1995 | Wilkerson | 318/802 |
| 5,465,019 | 11/1995 | Kliman | 310/156 |
| 5,483,139 | 1/1996 | Welles, II | 318/782 |
| 5,492,273 | 2/1996 | Shah | 236/44 A |
| 5,506,487 | 4/1996 | Young et al. | 318/811 |
| 5,534,763 | 7/1996 | Williams et al. | 318/799 |
| 5,548,197 | 8/1996 | Unsworth et al. | 318/757 |
| 5,583,404 | 12/1996 | Karwath et al. | 318/254 |
| 5,592,058 | 1/1997 | Archer et al. | 318/254 |
| 5,598,071 | 1/1997 | Dunfield et al. | 318/254 |

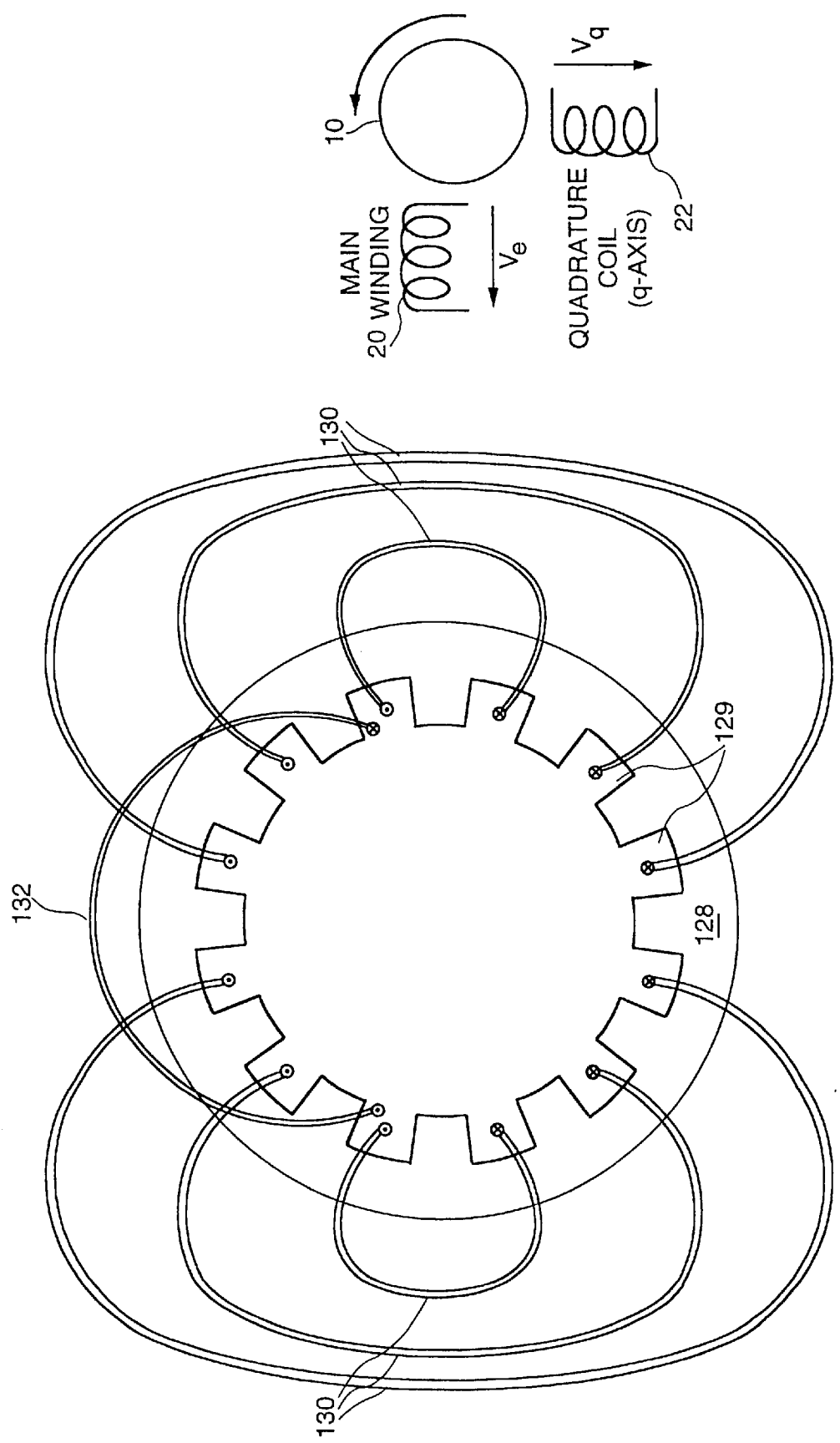

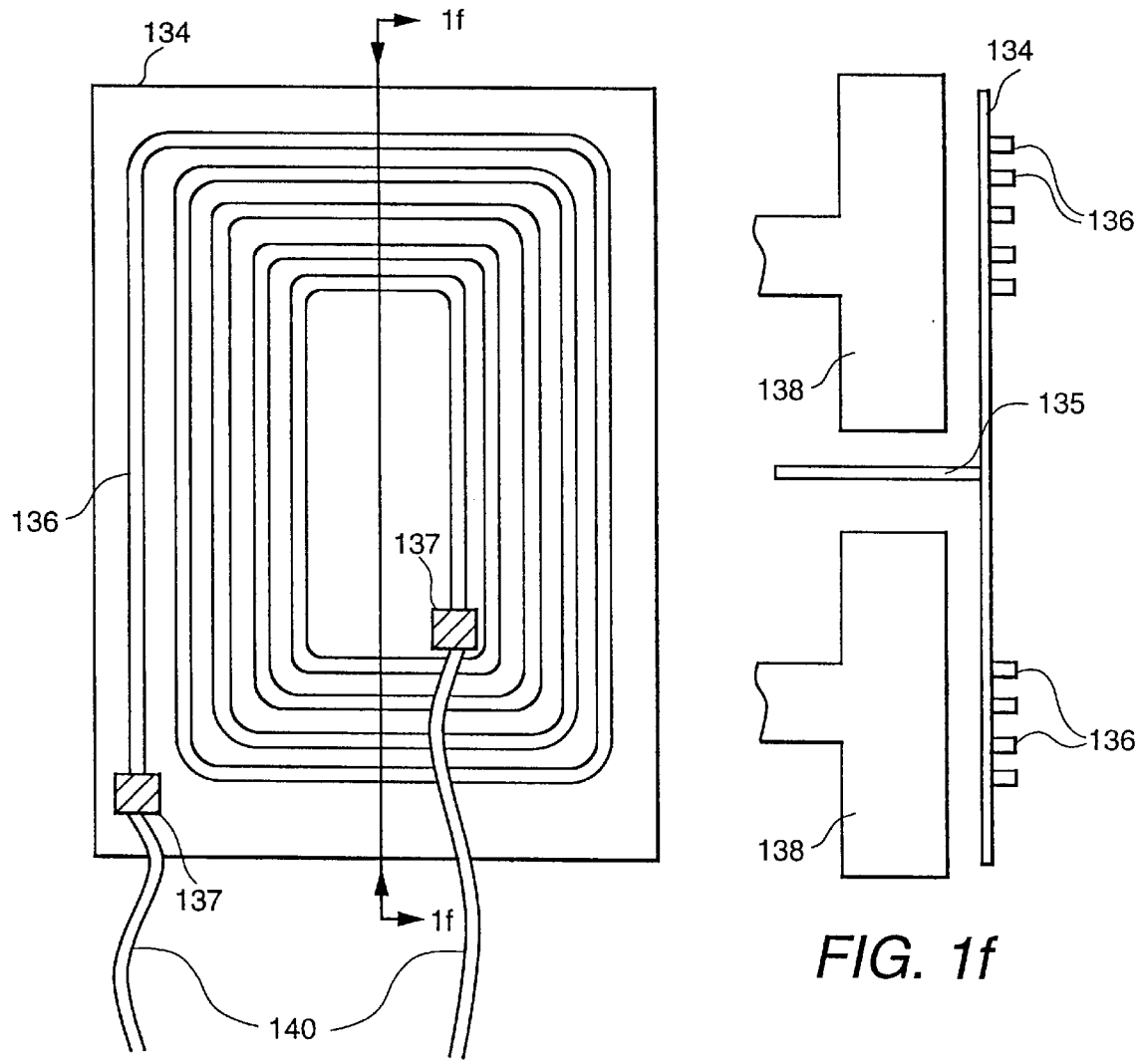
FIG. 1f
FIG. 1e
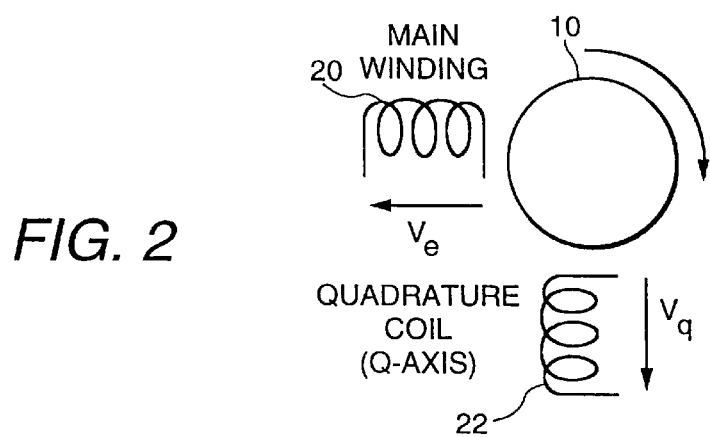
FIG. 2

FIG. 14(c) INT

FIG. 14(d) CMM

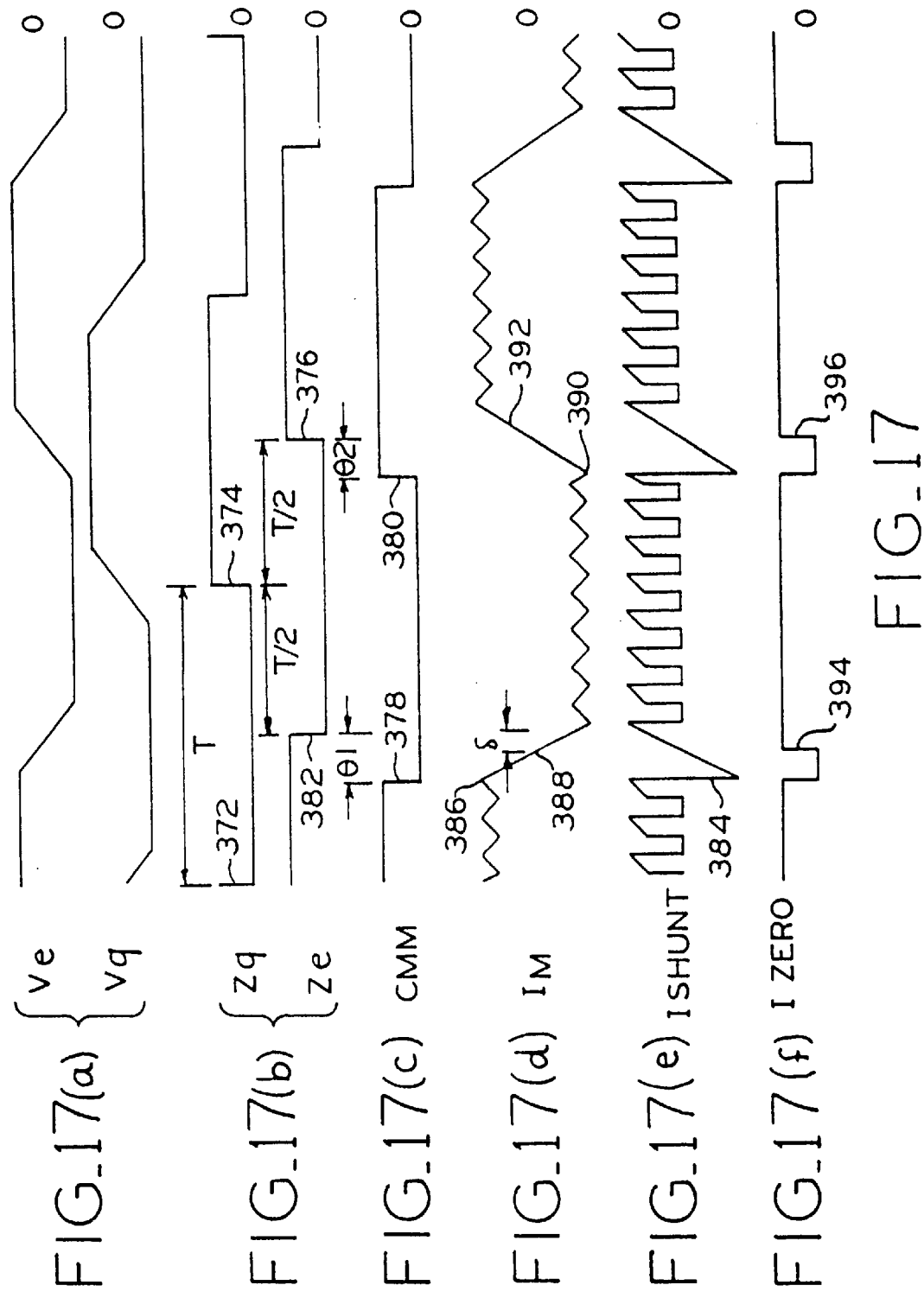

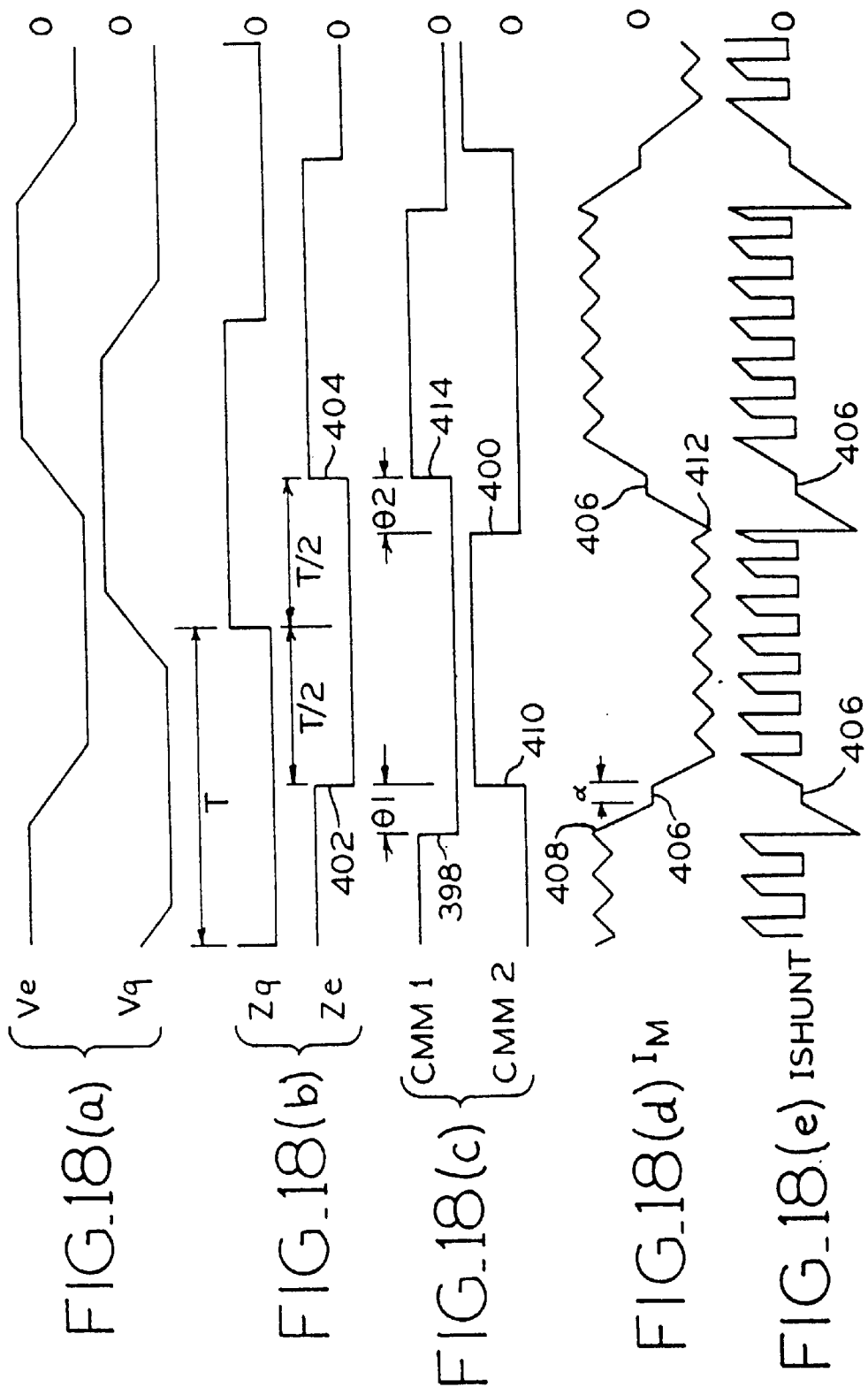

QUADRATURE AXIS WINDING FOR SENSORLESS ROTOR ANGULAR POSITION CONTROL OF SINGLE PHASE PERMANENT MAGNET MOTOR

This is a divisional application Ser. No. 08/680,010, filed on Jul. 15, 1996, now U.S. Pat. No. 5,796,194.

BACKGROUND OF THE INVENTION

Conventional hermetic refrigerator compressors typically use fixed speed single phase induction motors. Variable speed operation of motors is advantageous for improving efficiency. Conventional three phase permanent magnet (PM) motors, such as those being used for heating, ventilating, and air conditioning applications, are capable of variable speed operation but are more expensive than single phase PM motors which require fewer power semiconductor switches and associated gate drivers.

Refrigeration compressors which are hermetically sealed to prevent refrigerant leakage have several requirements of their motor drives. Most such compressors are designed to operate with a preferred direction of rotation due to the passive lubrication system which usually operates correctly in only one direction. Furthermore, a three-pin connector has been adopted as an industry standard for such compressors, so it is advantageous to have a maximum of three wires between the motor inside the compressor and its controller situated outside the compressor. The motor additionally should have long term reliability under high temperature operation (typically 65° C. ambient) and be capable of maintaining output torque and efficiency at rated speed by maintaining the current in phase with the motor back electromotive force (EMF) by appropriately phase-advancing the commutation signal.

Single phase PM motors require a suitable current commutation signal synchronized with the rotor position for proper operation. In most single phase applications, a Hall-effect position sensor is typically used to detect the rotor position and thereby control the motor. Such single phase motors having a Hall-effect sensor, however, generally require a total of five wires: two motor leads and three leads for the Hall-effect sensor (two too many for the standard sealing connector). Furthermore, the reliability of such sensors in the compressor environment is uncertain.

In order to avoid the use of a Hall sensor or other rotor position sensor, various sensorless control schemes have been developed for PM motors. In three phase PM motors under normal operation, there are times when one phase is open-circuited and has no current flowing in it. Under such conditions, the terminal voltage is equal to the back EMF voltage and can thus be sensed directly. Single phase motors, however, do not have natural intervals where the phase current remains zero for any length of time, and this approach is therefore not applicable.

For three phase motors, even if the phase current is non-zero, the back EMF voltage can be calculated by modeling the motor as a resistance, inductance, and back EMF voltage source, as described by M. Jufer, "Back-EMF Indirect Detection for Self-Commutation of Synchronous Motors," *European Power Electronics Conference*, 1987, pp. 1125–29. This technique can also be applied to single phase PM motors and has the advantage of not requiring any extra sensing leads. However, for single phase PM motors, it is difficult to provide a controllable preferred direction of rotation. Thus, the motor can start in either direction, depending on the initial rotor angular position. Fan and compressor drives generally are designed to operate in only one direction of rotation, so control over the rotation direction is critical. Furthermore, the required knowledge of the motor parameters is not always available and is subject to production and operating variations.

SUMMARY OF THE INVENTION

Among the several objects of this invention may be noted the provision of an improved single phase motor and method of operating the motor which permits having three or fewer connection wires; the provision of such motor and method which permits operation in a preferred running direction in severe environments; the provision of such motor and method which permits phase-advancing the commutation signal to maintain output torque and efficiency at high speeds; and the provision of such motor and method which is economically feasible and commercially practical.

Briefly described, a single phase permanent magnet motor embodying aspects of the invention has a rotor, a stator and a quadrature axis winding positioned for generating an output signal representative of rotor angular position.

In another embodiment of the invention, a motor has a rotor, a stator and a position sensor. The position sensor generates an output signal which represents rotor angular position and which has an angular relationship with back EMF generated by a main winding of the stator. The motor also includes a commutation estimator circuit responsive to the output signal for estimating zero crossings of the back EMF in the main winding and generating a commutation signal to commutate the main winding of the stator in advance of the estimated zero crossings of the back EMF by an angle θ calculated by the following:

$$\theta = \frac{L * \omega * I_{PEAK}}{V_S}$$

where ω is the speed of the rotor, $I_{PEAK}$ is a peak current in the main winding corresponding to a desired speed and/or torque of the motor, L is the motor inductance in the main winding, and $V_S$ is the voltage across the main winding.

Another form of the invention is directed to a method of starting a single phase permanent magnet motor that has a rotor, a stator and a quadrature axis winding positioned for generating an output signal representative of rotor angular position. The method includes the steps of applying direct current to a main winding of the stator for a length of time sufficient to momentarily align the rotor with the stator and applying no current to the main winding for a length of time sufficient for the rotor to return to a position in which a starting direction of the rotor is known. The method also includes the step of commutating current to the main winding while obtaining a commutation signal from the quadrature axis winding.

In another form, a method of starting a single phase permanent magnet motor includes first applying direct current to a main winding of the stator for a length of time sufficient to cause the rotor to begin to rotate and then commutating current to the main winding while obtaining a commutation signal from the quadrature axis winding.

In yet another form, a method of starting a single phase permanent magnet motor includes the steps of applying direct current to a main winding of the stator for a length of time sufficient to momentarily align the rotor with the stator and applying no current to the main winding for a length of time sufficient for the rotor to return to a position in which a starting direction of the rotor is known. The method also includes the steps of applying direct current to the main winding of the stator for a length of time sufficient to cause the rotor to begin to rotate and then commutating current to the main winding while obtaining a commutation signal from the quadrature axis winding.

Another form of the invention is directed to a method of operating a single phase motor that includes a rotor, a stator and a position sensor. The position sensor generates an output signal which represents rotor angular position and which has an angular relationship with back EMF generated by a main winding of the stator. The method includes the steps of estimating zero crossings of the back EMF in the main winding as a function of the output signal generated by the position sensor and generating a commutation signal in advance of the estimated zero crossings of the back EMF by an angle θ calculated by the following:

$$\theta = \frac{L * \omega * I_{PEAK}}{V_S}$$

where ω is the speed of the rotor, $I_{PEAK}$ is a peak current in the main winding corresponding to a desired speed and/or torque of the motor, L is the motor inductance in the main winding, and $V_S$ is the voltage across the main winding. Finally, the method includes the step of commutating current to the main winding in response to the commutation signal.

Yet another form of the invention is directed to a method of operating a single phase motor that includes a rotor, a stator and a position sensor. The position sensor generates an output signal which represents rotor angular position and which has an angular relationship with back EMF generated by a main winding of the stator. The method includes the steps of applying direct current to the main winding of the stator for a length of time sufficient to cause the rotor to begin to rotate, integrating the output signal generated by the position sensor, and generating a first commutation signal as a function of the integrated output signal. The method also includes the step of estimating zero crossings of the back EMF in the main winding as a function of the output signal generated by the position sensor and the further step of generating a second commutation signal in advance of the estimated zero crossings of the back EMF by an angle θ calculated by the following:

$$\theta = \frac{L * \omega * I_{PEAK}}{V_S}$$

where ω is the speed of the rotor, $I_{PEAK}$ is a peak current in the main winding corresponding to a desired speed and/or torque of the motor, L is the motor inductance in the main winding, and $V_S$ is the voltage across the main winding. Further, the method includes the steps of commutating current to the main winding in response to the first commutation signal when the speed of the rotor is less than a threshold speed and commutating current to the main winding in response to the second commutation signal when the speed of the rotor is greater than or equal to the threshold speed.

Alternatively, the invention may comprise various other systems and methods.

Other objects and features will be in part apparent and in part pointed out hereinafter.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

FIG. 1d is a top view of a quadrature axis winding position in a distributed stator winding embodiment.

FIG. 1e is a view of a quadrature axis coil fabricated on a printed circuit board.

FIG. 1f is a flattened sectional top view of the printed circuit board of FIG. 1e adjacent to a stator.

FIG. 2 is a schematic diagram illustrating a direction of forward (preferred) rotation.

FIG. 4 is a schematic diagram illustrating a direction of reverse rotation.

FIG. 17 is a set of exemplary timing diagrams illustrating the relationship between the back EMF and quadrature signals and the current signals of the motor of FIG. 1g and another preferred commutation strategy of the invention.

FIG. 18 is a set of exemplary timing diagrams illustrating the relationship between the back EMF and quadrature signals and the current signals of the motor of FIG. 1g when the conduction intervals are less than 180°.

DETAILED DESCRIPTION OF THE PREFERRED EMBODIMENTS

Figure 1:
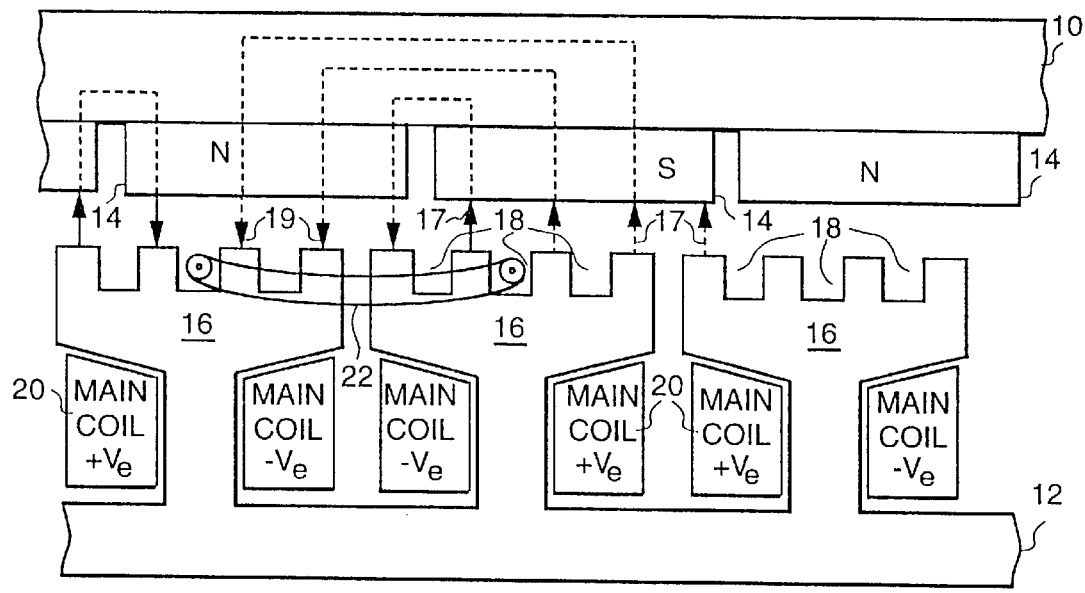
FIG. 1 is a flattened sectional top view of a single phase permanent magnet (PM) motor having a quadrature axis winding of the present invention for sensing rotor angular position.

FIG. 1 is a flattened sectional top view of a single phase permanent magnet (PM) motor showing main windings 20 and an additional coil for sensing position (a "quadrature axis winding" 22). Both the main and the quadrature axis windings are electromagnetically affected by magnet flux of a rotor 10. However the quadrature winding is not electromagnetically affected by magnet flux of a stator 12. This allows the quadrature winding to detect the rotor position without being affected by currents in main winding 20.

Both windings are electromagnetically affected by the magnet flux of the rotor because the direction of flux to or from the rotor due to each rotor magnet 14 (represented by flux lines 17 and 19) depends on the polarity of the rotor magnet adjacent a respective portion of a stator tooth 16. For example, arrows 19 are used to indicate portions of the stator teeth adjacent a magnet having N (north) type polarity whereas opposing directional arrows 17 are used to indicate portions of the stator teeth adjacent a magnet having S (south) type polarity. Therefore, when a tooth is situated such that different portions are adjacent different polarity magnets, the flux will vary with rotor position. Because of the physical offset between the main winding and the quadrature axis winding, the magnetic flux variation and hence the voltage waveforms in the two windings will not be in phase.

The quadrature axis winding is not electromagnetically affected by the flux from the main winding due to the offset between the windings and because each portion of a single tooth 16 will transmit stator flux in a common direction which is not affected by rotor position.

In one embodiment, stator 12 has teeth 16 each having three notches 18, and quadrature axis winding 22 is wound between the center notches of two teeth and is therefore about ninety electrical degrees out-of-phase with main winding 20 of the stator. Multiple windings in series (shown in FIG. 1c) can be used to increase the magnitude of the induced quadrature axis winding voltage.

Figure 1A:
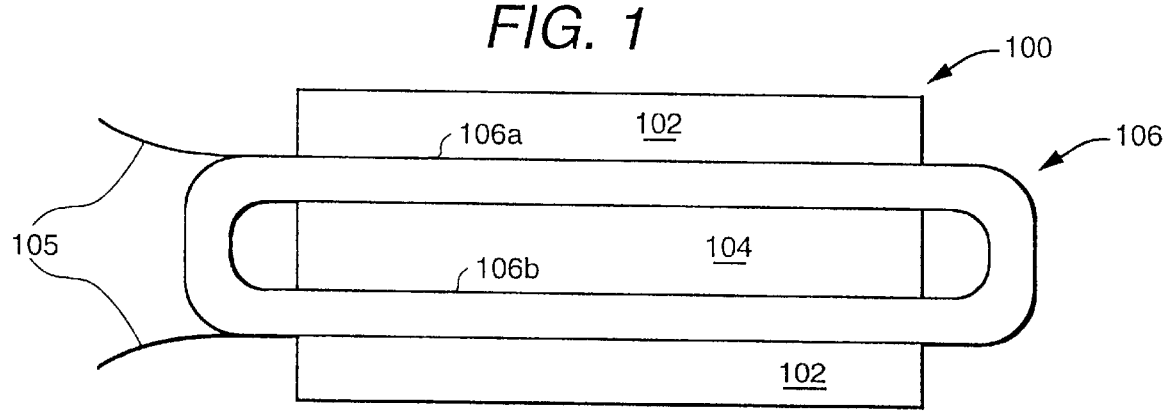
FIG. 1a is a view of a pre-wound winding on a forming tool.

FIG. 1a is a view of a pre-wound quadrature axis winding 106 with leads 105 on a forming tool 100. In one embodiment the quadrature axis winding comprises insulated wire, such as bondable enamel wire or wire covered with a plastic jacket. Such bondable enamel wire is available in diameters under 0.010 inches so that relatively large numbers of turns may be packed into the tooth slots without protruding into the air gap between the rotor and stator.

The forming tool can have a middle portion 104 higher than two side portions 102 with side segments 106a and 106b of the winding being relatively straight. Before the coil is removed from the forming tool it can be baked at a moderate temperature such as 200° C. to set the bondable enamel so that the coil becomes a solid mass. Upon cooling the coil is a relatively rigid, self-supporting structure which may be handled and inserted in the tooth notches. Liners are not usually required because voltage on the quadrature axis winding is low. The quadrature axis winding should extend a short distance beyond the edge of the stator before forming an end turn so that there is no danger of the laminations nicking the coil.

Figure 1B:
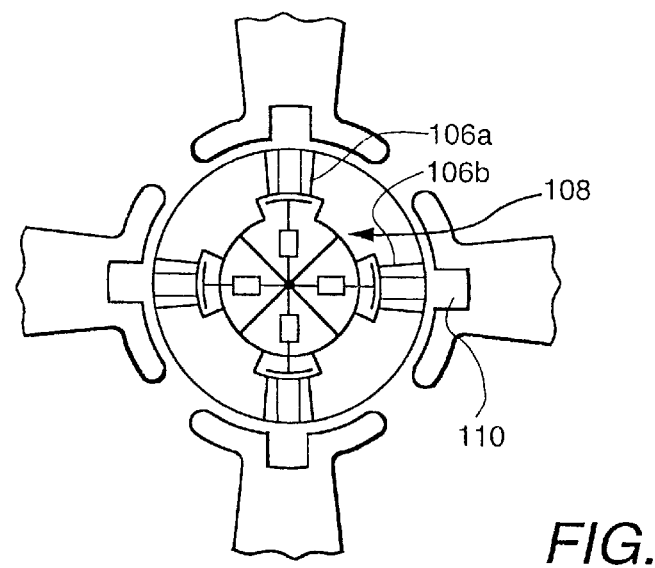
FIG. 1b is a sectional top view of equipment of one embodiment for positioning pre-wound quadrature axis windings in stator slots.

If quadrature axis windings in series are desired on several or all of the teeth, multiple section coils can be easily wound in the forming tool by automatic machinery of conventional design. In fact, the coils can be wound into a segmented cylindrical form and inserted into the tooth faces by mechanisms in the form as shown in FIG. 1b, which is a sectional top view of equipment 108 for positioning pre-wound quadrature axis windings in slots 110 in the stator teeth.

Figure 1C:
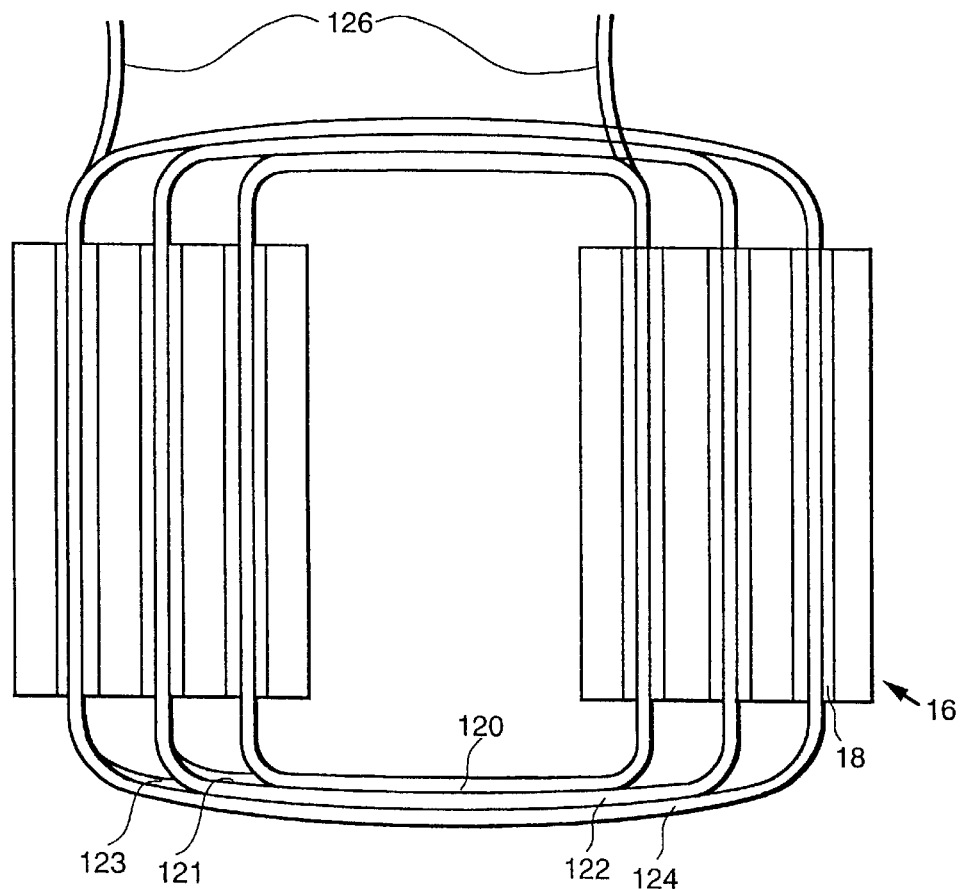
FIG. 1c is a flattened side view of a quadrature axis winding having a multiple coil structure.

FIG. 1c is a flattened side view of a quadrature axis winding having a multiple coil structure with leads 126. For example, stator teeth 16 each having three notches 18 are shown with the quadrature axis winding being wound in three coil sections 120, 122, and 124 through the teeth with the wound sections coupled by portions 121 and 123 of the winding. The embodiment of FIG. 1c is useful because the number of winding turns can be increased over an embodiment wherein only one coil section is present and therefore the magnitude of the output signal of the quadrature axis winding can be amplified.

FIG. 1d is a top view of a quadrature axis winding 132 position in a distributed stator winding embodiment. A stator 128 has teeth defining slots 129 wherein main stator windings 130 are inserted into the slots. The quadrature axis winding can be inserted into the slots in the same manner as the stator windings with the selection of slots for insertion being made so as to create a desired phase shift.

FIG. 1e is a view of a quadrature axis coil fabricated on a flexible printed circuit board 134. This is another useful embodiment for motors not having notches on stator teeth. A conductive material such as copper can be applied to a non-conducting board and etched to form a winding 136 with pads 137, and leads 140 can then be attached. FIG. 1f is a flattened sectional top view of the printed circuit board of FIG. 1e adjacent stator teeth 138. The printed circuit board can be attached with an adhesive to the inside of the stator bore (not shown) or supported, for example, by using an extension piece 135.

Figure 1G:
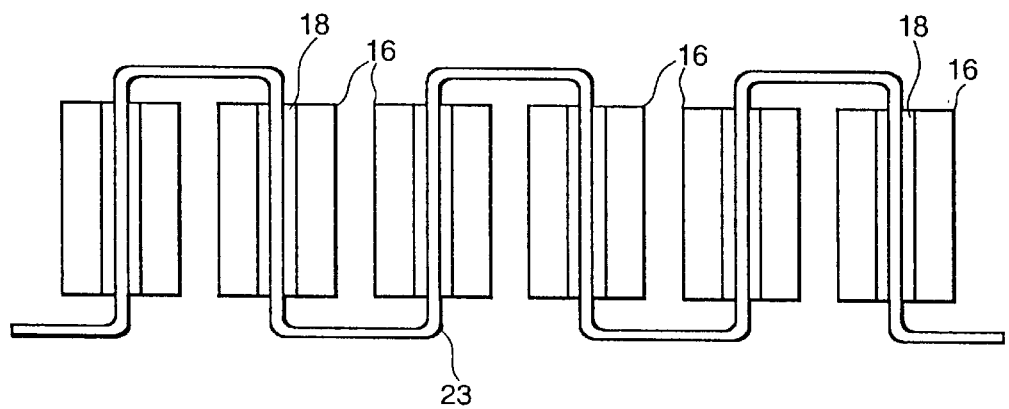
FIG. 1g is a flattened side view of a quadrature winding extending through a plurality of stator slots.

FIG. 1g is a flattened side view of a quadrature winding 23 extending through a plurality of notches 18 in stator teeth 16. If quadrature winding 23 extends through each of the stator teeth in a respective stator, the output signal of the quadrature axis winding will be the average over the stator teeth. Another advantage of this embodiment is that the quadrature winding has more turns than a single turn winding without the need for a multiple turn coil.

Figure 3:
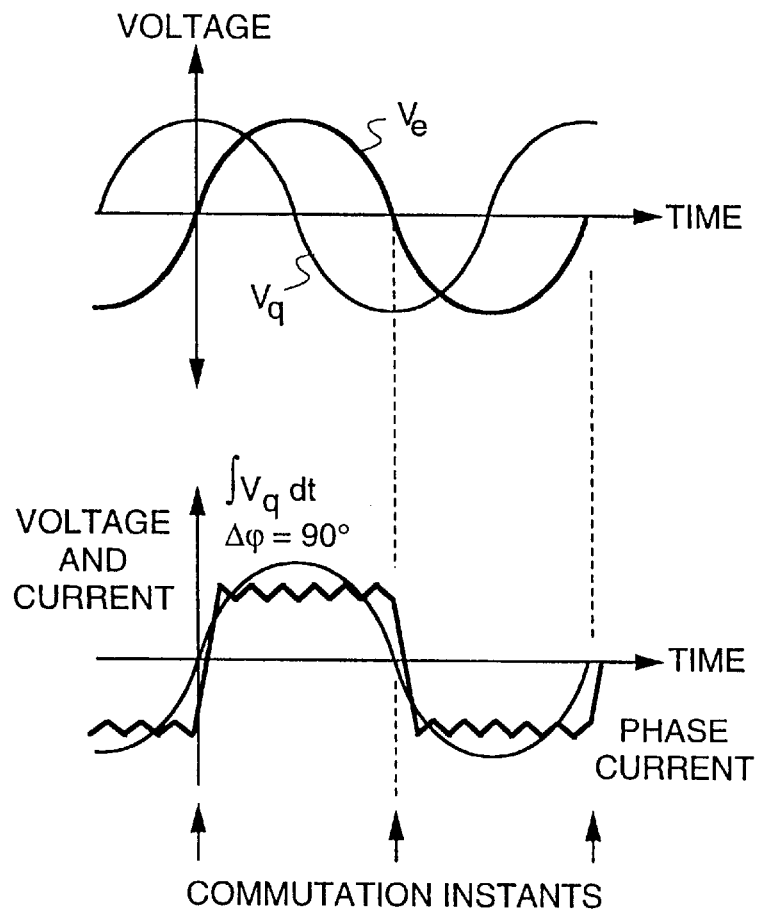
FIG. 3 is a graph of voltage, integrated voltage, and phase current versus time for the diagram of FIG. 2 illustrating an electrical phase lead and commutation points of the voltage on the quadrature axis winding during low speed operation.

FIG. 2 is a schematic diagram illustrating a direction of forward (preferred) rotor rotation, and FIG. 3 is a graph of the main winding back EMF voltage ($V_e$), the quadrature winding voltage ($V_q$), integrated quadrature winding voltage, and phase current versus time for the diagram of FIG. 2. This graph illustrates the ninety degree electrical phase lead and commutation points of the voltage on the quadrature axis winding during low speed operation.

The quadrature axis winding voltage, which is directly proportional to rotor speed and, as discussed above, is out-of-phase with the back EMF of the main winding, as shown by FIG. 3. Preferably, the degree to which the quadrature axis winding is out-of-phase ranges from 75 to 105 degrees with an optimum value being about ninety electrical degrees. However, the invention is expected to work for any out-of-phase quadrature axis winding capable of providing rotor angular position control in the manner described below. Whether the quadrature axis winding electrical phase leads or lags depends upon the direction of rotor rotation, as discussed below.

The motor controller ideally requires a commutation signal corresponding to the zero crossings of the main winding back EMF voltage $V_e$. To obtain the correspondence, the quadrature axis winding is passed through an integrator (illustrated as a lead/lag filter, for example, in FIG. 9) which phase retards the signal. In one embodiment, the phase retard of the integrator is about ninety degrees. When the quadrature axis winding phase leads by about ninety degrees and the integrator phase retards the signal by about ninety degrees, the integrated signal becomes substantially in-phase with the main winding back EMF voltage, as shown in FIG. 3, and a commutation signal can be obtained by passing the integrated signal through a comparator (shown in FIG. 9) to detect the zero crossings of the quadrature axis winding voltage. Each zero crossing represents the initiation of a change in the polarity of the current in the main winding.

Integrators inherently have gains inversely proportional to their input frequencies. The voltage induced in the quadrature axis winding is directly proportional to the motor speed and thus the motor frequency. Therefore, the output signal of the integrator has an approximately constant amplitude which is independent of motor speed/frequency; in fact, the output signal of the integrator corresponds to motor flux. Due to the relatively constant signal amplitude, the zero crossings can be easily detected over a wide range of speeds. The low frequency cutoff of the integrator will determine the minimum operating speed.

Figure 5:
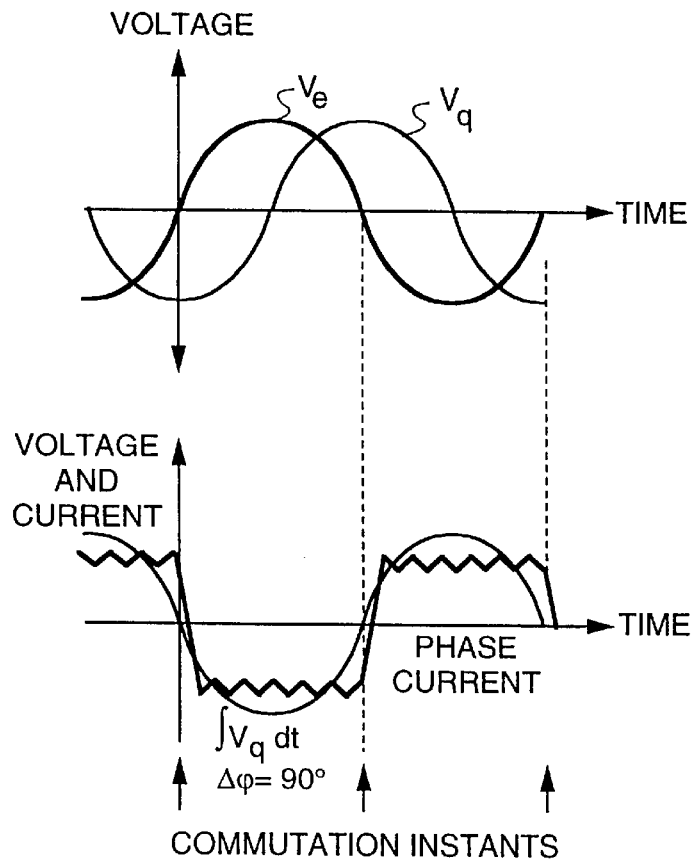
FIG. 5 is a graph of voltage, integrated voltage, and phase current versus time for the diagram of FIG. 4 illustrating an electrical phase lag and commutation points of the voltage on the quadrature axis winding during low speed operation.

FIG. 4 is a schematic diagram illustrating a direction of reverse rotation, and FIG. 5 is a graph of voltage, integrated voltage, and phase current versus time for the diagram of FIG. 4 illustrating an electrical phase lag and commutation points of the voltage on the quadrature axis winding.

If rotation of the rotor occurs in a reverse direction (a direction opposite to the preferred steady-state direction of the motor), as shown in FIG. 5, instead of leading the main winding voltage by ninety degrees, the quadrature axis winding voltage lags by ninety degrees. Therefore, when the voltage is integrated, the inherent phase retard of the integrator produces a commutation signal which is 180 degrees out of phase with the back EMF. This condition produces a braking torque, as the machine is acting as a generator, which causes the motor to slow down. Therefore, the motor has only one possible steady state (forward) direction of rotation—a feature that is important when driving machines such as fans and compressors.

The preferred direction of rotation can be easily changed, if desired, by either inverting the commutation signal or by reversing the polarity of either quadrature axis winding 22 or main winding 20.

During motor start-up, the motor may transiently rotate in the reverse direction, depending on the initial rotor position. If the motor does begin to rotate in the reverse direction, the braking torque will occur, as discussed above, to stop any such reverse rotation. To improve the motor start-up characteristics one technique hereinafter referred to as "pre-alignment" is to apply a DC current to the main winding for a short period on the order of a fraction of a second to momentarily align the rotor and then, before commutating the current to the main winding, allow the rotor to fall back to a position in which the starting direction of the rotor is known.

Another technique hereinafter referred to as "kick-start" is to apply a DC current pulse of fixed duration ranging from tens of milliseconds to a second to get the rotor in motion and then switch to the quadrature axis winding signal for commutation. The commutation signal, which determines the polarity of the current applied to the motor, is normally obtained from the polarity of the integral of the quadrature axis signal. When starting, the quadrature coil signal is of low amplitude and is often noisy. To improve the starting characteristic, the commutation signal is forced to remain in one state for a fixed duration of tens of milliseconds to up to a second during the kick-start period. After this period the polarity of the integral of the quadrature axis voltage is used for commutation allowing normal operation. The optimum period of the kick-start pulse is determined by the motor and the load inertia and is best determined experimentally as that which gives the most reliable starting performance.

These techniques can be applied separately or in combination. Pre-alignment is designed to ensure a given rotation direction, whereas a kick-start pulse is expected to improve starting reliability. If both are to be used, pre-alignment is preferably performed before the kick-start pulse is applied.

Figure 6:
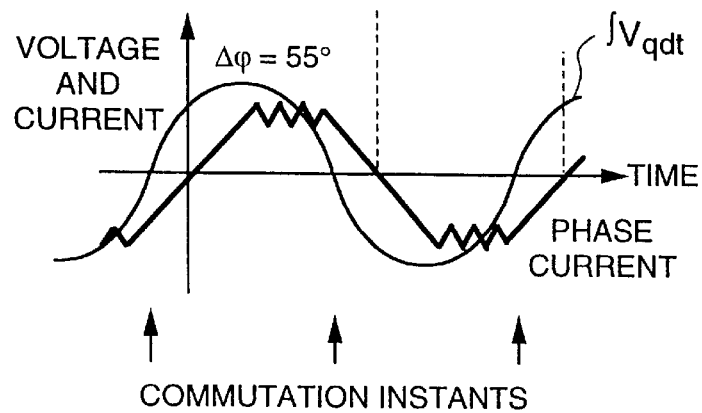
FIG. 6 is a graph of integrated voltage and phase current versus time for the diagram of FIG. 2 illustrating an electrical phase lead and commutation points of the voltage on the quadrature axis winding during high speed operation.

FIG. 6 is a graph of integrated voltage and current versus time for the diagram of FIG. 2 illustrating commutation points of the voltage on the quadrature axis winding during rated speed operation. During rated speed operation, it is advantageous to phase advance, i.e., reduce the number of degrees of the phase retard, in order to maintain the main winding back EMF voltage and the phase current waveform in phase and thereby obtain maximum output power. The required phase advance for efficient operation increases from zero degrees (ninety degree phase retard) at near standstill to typically about 35° (55° phase retard) at rated speed for single phase PM motors and is a function of speed, bus voltage, and inductance.

Figure 7:
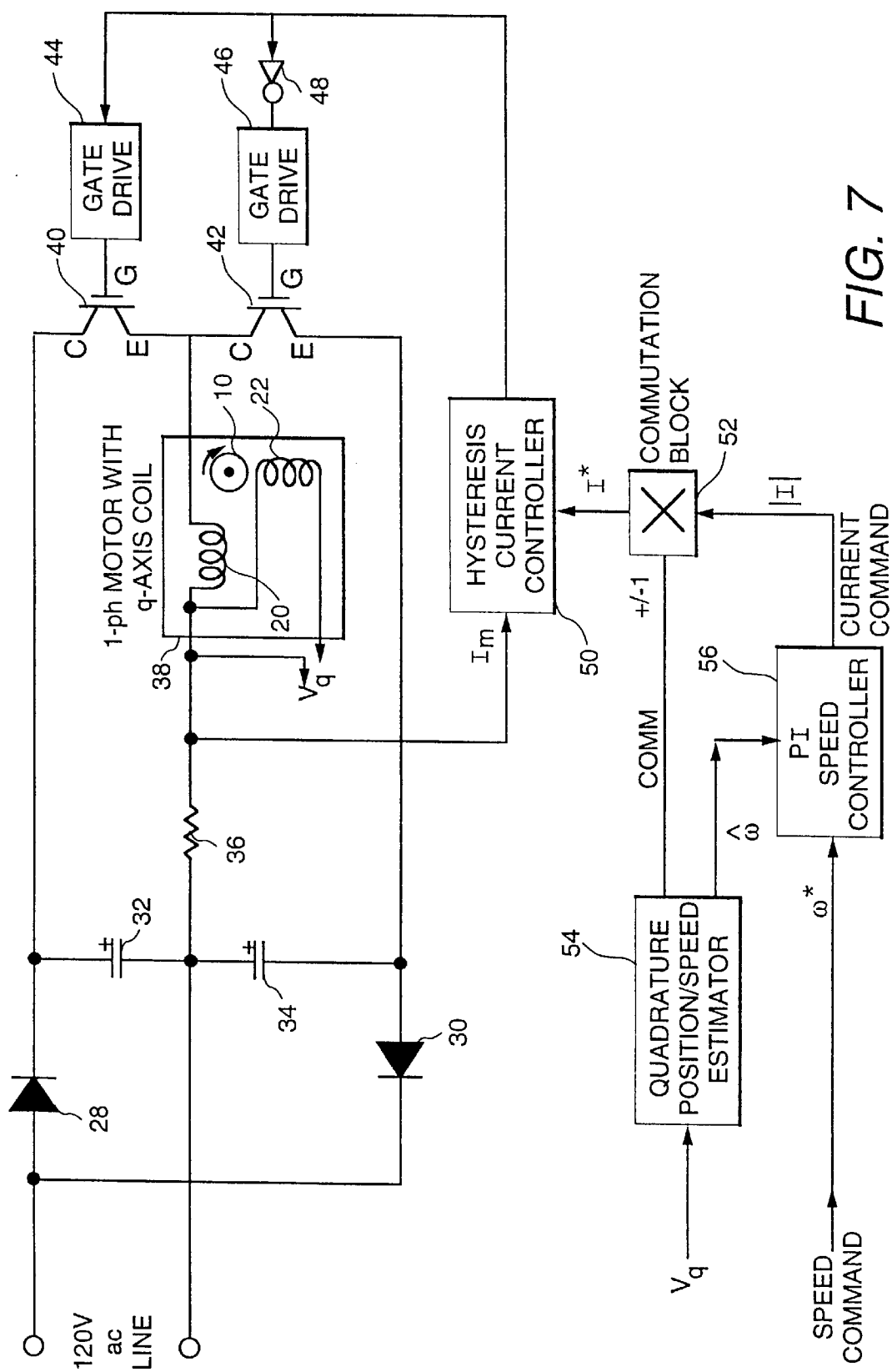
FIG. 7 is a block diagram of one embodiment of a single phase PM motor controller of the present invention.

FIG. 7 is a block diagram of one embodiment of a single phase PM motor controller (drive circuit) of the present invention which requires only two power electronic switches 40 and 42. The quadrature axis winding technique can also be applied to other single phase controller configurations such as H-bridge and bifilar configurations. The configuration shown in FIG. 7 has an advantage for compressor applications as it allows a three-wire motor connection to be more easily maintained as described below. The power electronic switches may comprise switches such as MOSFETs or IGBTs, for example.

A 120 V ac line supplies voltage for the motor through a half-bridge diode/capacitor configuration as follows. A supply lead of the ac line can be coupled to a first diode 28. A return lead of the ac line can be coupled to a node coupling a first capacitor 32, a second capacitor 34, and a resistor 36 which are each in parallel. Second capacitor 34 is coupled at an opposing end to switch 42 and also to a second diode 30 which in turn directs its output signal to first diode 28.

First diode 28 is coupled to another end of first capacitor 32 as well as to switch 40. The switches are coupled to the main winding, as well as to respective gate drives 44 and 46. Resistor 36 is coupled to another side of the main winding as well as to a hysteresis current controller 50. The main winding passes a motor current signal $I_m$ to the hysteresis current controller which in turn sends a gate drive signal to the gate drives. Gate drive 46 is coupled to the hysteresis controller through an inverter 48.

A differential voltage signal $V_q$ from the quadrature axis winding is directed to a Quadrature Axis Position/Speed Estimator 54 which in turn sends a commutator signal comm to a commutation block 52 and an estimated speed signal ω̂ to a proportional-integral (PI) speed controller 56. The estimated speed signal is obtained by rectifying the quadrature axis winding voltage, the mean value of which is proportional to motor speed. The PI closed loop speed controller uses the estimated speed along with a desired speed command ω* to determine the current command signal for the commutation block. The commutation block multiplies the commutation signal (which is indicative of whether the current signal should be inverted (−1) or unchanged (+1)) and the current command signal to send a commutated current command signal I* to the hysteresis current controller.

The main winding and the quadrature axis winding both require two connections, so a total of four wires from the motor would normally be required. To avoid redesigning the existing three-pin connector, one of the connections for the main winding 20 can be shared with one of the connections from the quadrature axis winding 22.

Figure 8:
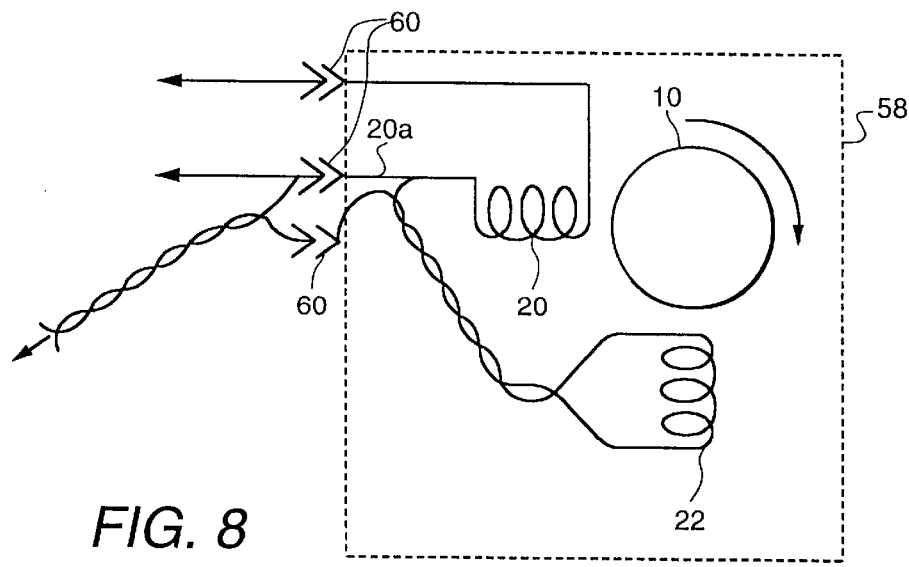
FIG. 8 is a circuit diagram illustrating a modified wire connection which may be used in the controller embodiment of FIG. 7.

FIG. 8 is a circuit diagram illustrating a modified three-pin connection 60 which may be used in the controller embodiment of FIG. 7 for the sharing of a connection by the main winding 20 and quadrature axis winding 22 in a compressor case 58. A pseudo "Kelvin" or four-wire connection can be used to minimize the shared path 20a between a portion of the high current main winding and the low level quadrature axis winding, and hence reduce the interference.

Figure 9:
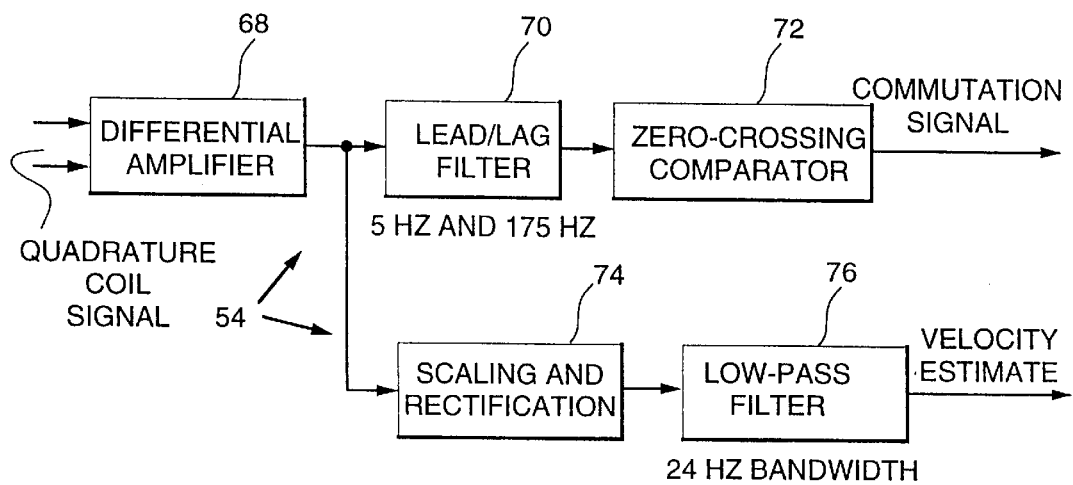
FIG. 9 is a block diagram of a quadrature axis winding position and speed estimator of the present invention which may be used in the embodiment of FIG. 7.

FIG. 9 is a block diagram of an embodiment of quadrature axis winding position and speed estimator 54 of the present invention.

A differential amplifier 68 can be used to remove common-mode noise on the quadrature axis connections. The differential amplifier supplies a signal to an integrator (shown as lead/lag filter 70) which in turn supplies a phase retarded signal to zero crossing comparator 72 which provides the commutation signal. In one embodiment the lead/lag filter has characteristic frequencies of 5 Hz and 175 Hz. The differential amplifier also supplies a signal to a scaling and rectification block 74 which sends a rectified signal to a lowpass filter 76 for providing the speed estimation. In one embodiment the lowpass filter has a bandwidth of 24 Hz. The speed can alternatively be estimated based on the time interval between successive zero crossings of the phase retarded signal.

The lead/lag filter is designed to phase advance the commutation signal to maintain the current in phase with the motor back EMF for purposes of maintaining high torque per ampere and high efficiency as the rotor speed is increased. With a conventional Hall-effect sensor or back EMF sensing embodiment, phase advancing the commutation signal requires additional circuitry, such as an analog or digital phase locked loop, to track the commutation frequency and produce the required phase advance. Such additional circuitry is not required by the present invention.

Figures 10, 11:
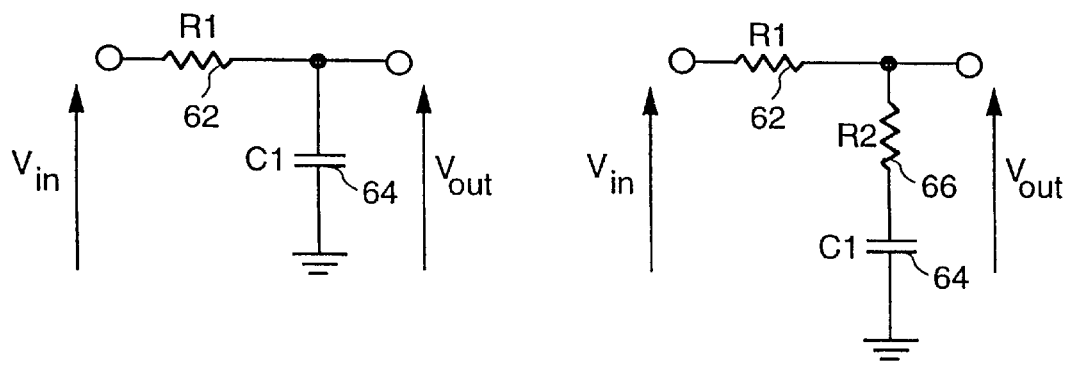
FIG. 10 is a circuit diagram of a passive lag filter which may be used in the embodiment of FIG. 9.
FIG. 11 is a circuit diagram of a passive lead/lag filter which may be used in the embodiment of FIG. 9.

FIG. 10 is a circuit diagram of a passive implementation of a first order lowpass filter which may be used for integrating in the embodiment of FIG. 9. The filter includes a resistor 62 in series with a capacitor 64. The cutoff frequency of the lowpass filter is designed to be lower than the lowest expected operating speed, for example, a speed such as 10 rpm. The expected ninety degree phase shift is obtained at rated speed, for example, at 1000 rpm.

FIG. 11 is a circuit diagram of a passive lead/lag filter which may be used in the embodiment of FIG. 9. This filter can be fabricated by adding a single resistor 66 in series with capacitor 64 or a capacitor (not shown) in parallel with resistor 62 to the embodiment of FIG. 10.

A lead/lag filter can be used to create a phase advance at higher speeds by designing the filter such that the phase retard reduces as the speed increases. The passive lead/lag filter can reduce the phase retard from ninety degrees at medium speeds to a lesser number of degrees (In one embodiment about 55 degrees) at rated speed. This corresponds to 35 degrees of phase advance at rated speed, which is desirable for efficient motor performance.

Figure 12:
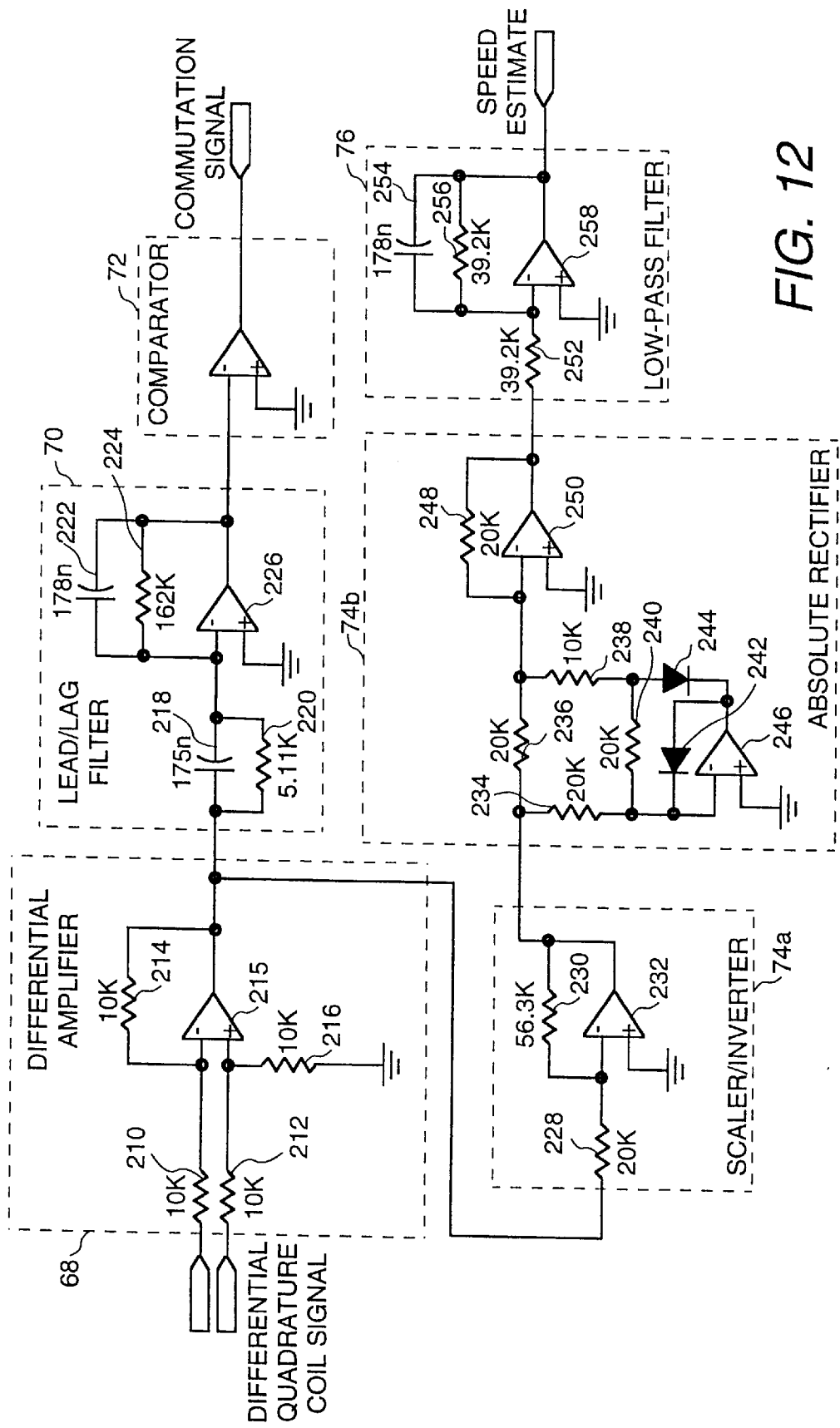
FIG. 12 is a circuit diagram illustrating one embodiment for designing the electronic components for the block diagram of FIG. 9.

FIG. 12 is an analog circuit diagram illustrating one embodiment for designing the electronic components for the block diagram of FIG. 9.

The quadrature axis winding signal is fed to differential amplifier 68 which comprises a conventional differential amplifier circuit for removing the common-mode noise on the connections. In one embodiment, the input signals are fed through resistors 210 and 212 to the input terminals of an operational amplifier 215, a resistor 214 is coupled between a negative input terminal and an output terminal of operational amplifier 215, and a resistor 216 is coupled between a positive input terminal of operational amplifier 215 and ground.

The differential amplifier supplies a signal to an active lead/lag filter 70 which comprises a parallel combination of a capacitor 218 and a resistor 220 coupled to a negative input terminal of an operational amplifier 226, as well as a parallel combination of a capacitor 222 and a resistor 224 coupled between the negative input terminal and an output terminal of operational amplifier 226. Lead/lag filter 70 supplies a phase retarded signal to zero crossing comparator 72 which provides the commutation signal.

The differential amplifier also supplies a signal to a scaler/inverter 74a comprising a resistor 228 coupled to a negative input terminal of an operational amplifier 232 and a resistor 230 coupled between the negative input terminal and an output terminal of the operational amplifier.

The inverted signal is then supplied to a rectifier 74b. In one embodiment, rectifier 74b comprises four resistors 234, 236, 238, and 240 in parallel with one of the resistors (resistor 240) additionally in parallel with two diodes 242 and 244, one of which is coupled across a negative input terminal and an output terminal of an operational amplifier 246. Resistors 236 and 238 are further coupled to a negative input terminal of an operational amplifier 250, with a resistor 248 coupled across the negative input and output terminals of operational amplifier 250 to complete the rectifier.

The output signal of the rectifier is passed through a low pass filter 76 comprising a resistor 252 coupled to a negative input terminal of an operational amplifier 258, as well as a parallel combination of a capacitor 254 and a resistor 256 coupled between the negative input terminal and an output terminal of operational amplifier 258. The lowpass filter provides the speed estimation signal.

Figure 13:
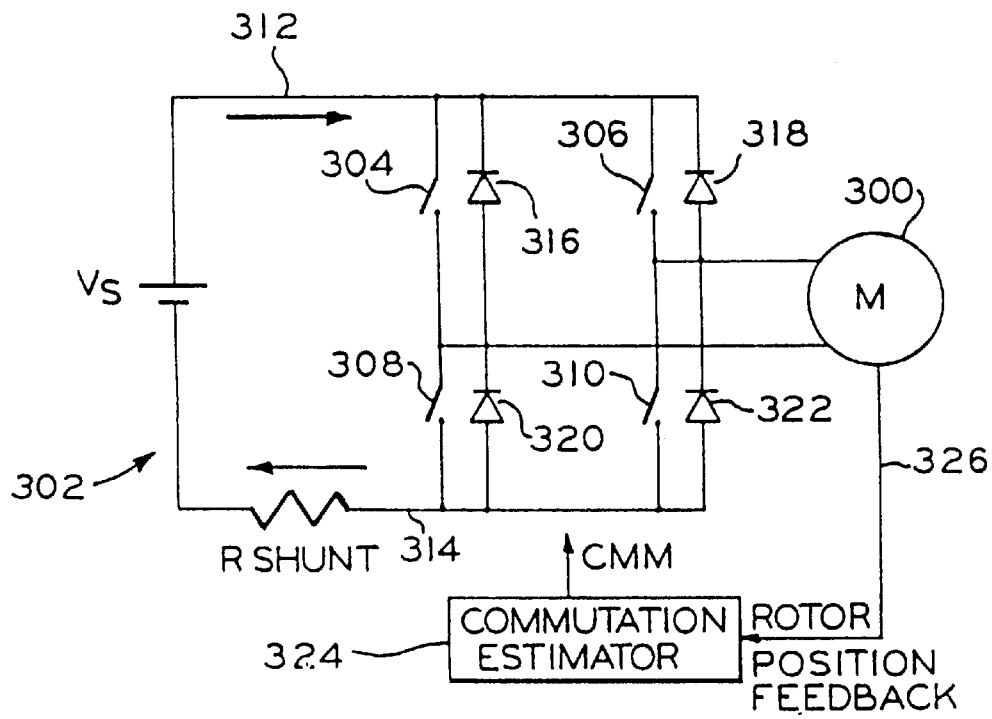
FIG. 13 is a schematic diagram of an inverter bridge for driving the motor of FIG. 1.

Referring now to an alternative embodiment, FIG. 13 shows a four-wire lead count implementation of the invention. As described below, this implementation of the invention uses zero crossing detection of the quadrature coil signal and a commutation estimation strategy embodied by a microcomputer and/or adaptive integrator. Further, the four-wire implementation is driven by an inverter bridge and performs current regulation by sensing current on a DC link.

As shown in FIG. 13, a motor 300, such as the motor described above, is for use in driving a rotatable component (not shown). The rotatable component may be an agitator and/or basket of a laundering apparatus, a fan or blower, or a compressor as described in, for example, commonly assigned U.S. Pat. Nos. RE 33,655, 5,492,273, 5,418,438, 5,423,192, and 5,376,866, the entire disclosures of which are incorporated herein by reference. In a preferred embodiment of the invention, motor 300 is a single phase, electronically commutated motor. It is to be understood, however, that motor 300 may be any electronically controllable motor. Such motors may be any electronically controllable motor or dynamoelectric machine typically powered by an electronic commutating circuit. Such motors include, for example, external rotor motors (i.e., inside out motors), permanent magnet motors, single and variable speed motors, selectable speed motors having a plurality of speeds, and brushless dc motors, including electronically commutated motors, switched reluctance motors and induction motors. In addition, the motors may be multiphase motors or single phase motors and, in any case, such motors may have a single split phase winding or a multi-phase winding. Such motors may also provide one or more finite, discrete rotor speeds selected by an electrical switch or other control circuit.

Figure 16:
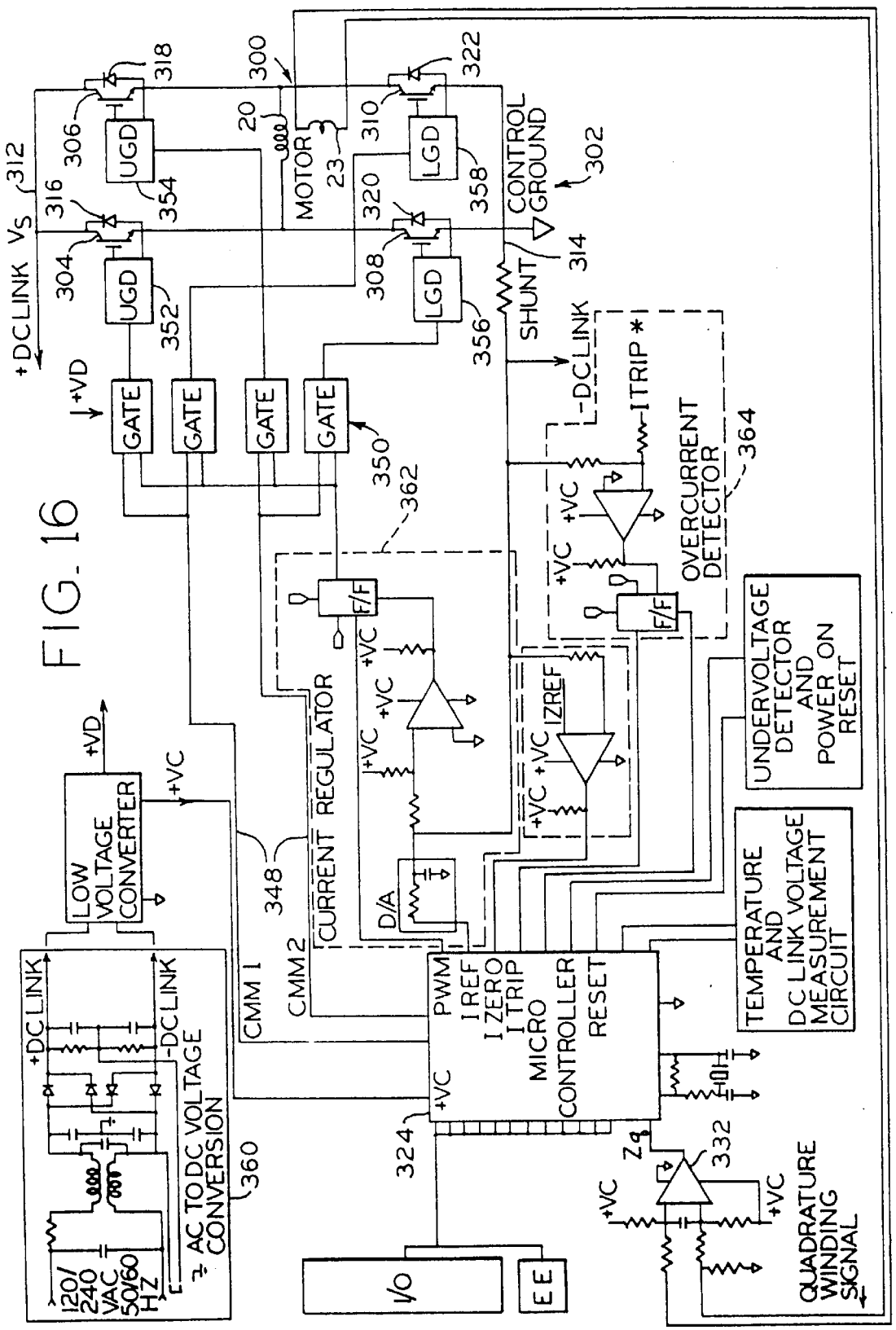
FIG. 16 is a schematic diagram of a motor drive circuit including the quadrature signal processing circuit of FIG. 15.

A supply $V_S$ provides high voltage DC power to main winding 20 (see FIG. 16) via an inverter bridge 302 (also see FIG. 16). The inverter bridge 302, illustrated as an H-bridge in FIG. 13, includes a plurality of power switches 304, 306, 308, 310 between a positive rail 312 and a negative rail 314. For example, the power switches 304, 306, 308, 310 may be IGBT's, BJT's or MOSFET's. Inverter bridge 302 also includes a plurality of flyback diodes 316, 318, 320, 322 corresponding to switches 304, 306, 308, 310, respectively. Each flyback diode 316, 318, 320, 322 is preferably coupled in an anti-parallel relationship with each switch 304, 306, 308, 310, respectively. By selectively switching power switches 304, 306, 308, 310 to connect supply $V_S$ to winding 20, inverter bridge 302 provides power to winding 20 in at least one preselected sequence for commutating main winding 20. In this embodiment, main winding 20 is the direct or torque-producing coil of motor 300 (see FIG. 16). It is to be understood that supply $V_S$ may also provide power to operate the various other circuits in the system.

According to one embodiment of the invention, a commutation estimator circuit 324 (see FIG. 15) generates motor control signals, or commutation signals, for commutating winding 20. In a preferred embodiment, the commutation estimator circuit 324 is embodied by a microcontroller or microcomputer which executes routines for determining optimum commutation instances as a function of the desired speed and/or torque of motor 300. As such, commutation estimator circuit operates as a state machine. In response to the commutation signals, motor 300 produces a peak current that corresponds to the load torque demand. The current in winding 20 in turn produces an electromagnetic field for rotating rotor 10 of motor 300. By matching torque load with produced torque, motor 300 operates at a desired torque or speed.

The commutation signals preferably include a series of pulse width modulated cycles, wherein each cycle causes a corresponding switching event of power switches 304, 306, 308, 310. Winding 20 of motor 300 is adapted to be commutated in at least one preselected sequence and power switches 304, 306, 308, 310 selectively provide power to winding 20 in the preselected sequence. By regulating current and, thus, torque, in motor 300, the load and motor loss demand torque may be matched so that motor 300 achieves the desired speed. In the alternative, it is contemplated that a voltage regulated control strategy, rather than a current regulated strategy, may be implemented for controlling speed and/or torque of motor 300.

In a preferred embodiment, inverter bridge 302 operates from a single commutating signal which selects either switches 304 and 310 or switches 306 and 308 depending on the position of rotor 10. In this embodiment, only one of the active switches (e.g., switch 308 or 310) is involved in current regulation (pulse width modulating) at any given time. By performing pulse width modulation, inverter bridge 302 preferably provides a peak current to winding 20 that corresponds to the desired speed and/or torque of motor 300. As an example of the normal motoring operation of motor 300, a set of gate drives (not shown) enable a pair of switches, such as switches 304 and 310, in response to a commutation signal generated by commutation estimator circuit 324. Commutation estimator circuit 324 causes the pair of switches 304, 310 to be enabled wherein one of the two switches (e.g., switch 310) performs pulse width modulation while the other remains in its on state for the entire commutation interval as commanded by the commutation logic. The polarity of the motor back EMF during this time interval is counter to the supply voltage $V_S$ such that the driving electromotive force developing current in motor 300 is the supply $V_S$ minus the back EMF. Commonly assigned U.S. Pat. No. 4,757,603, for example, the entire disclosure of which is incorporated herein by reference, shows a pulse width modulation control for a motor.

Referring further to FIG. 13, commutation estimator circuit 324 receives signals via line 326 representative of the position of rotor 10 (see FIG. 8). For example, quadrature winding 23, illustrated in FIG. 1g, provides rotor position feedback. As shown in FIG. 1g, quadrature winding 23 is positioned along the center of each stator tooth 16 and wound from tooth to tooth along stator 12. Notch 18 of each tooth 16 retains winding 23 in place. Due to its position in the center of teeth 16, quadrature winding 23 provides for cancellation of flux originating from torque producing currents circulating in main winding 20. In other words, the magnetic flux of adjacent poles cancel so that the magnetic flux of stator 12 does not affect the voltage induced in quadrature winding 23. Further, since quadrature winding 23 is wound along the entire stator 12 and positioned out-of-phase from winding 20, the voltage induced in the quadrature coil is a phase-shifted signature of the voltage induced in main winding 20. The quadrature signal also accounts for all asymmetries rotor 10 may have because it is essentially an average signal for all of the stator teeth 16. The averaging effect of the quadrature coil associated with pole alignment on the motor magnets has a beneficial effect on the bidirectionality of the motor (i.e., its ability to produce the same torque in both directions) in the presence of unevenness of the magnet arcs due to manufacturing tolerances.

The magnitude of the quadrature voltage signal depends on the speed of rotor 10, the stack length of the laminations comprising stator 12, the magnet strength and length of rotor magnet 14 (see FIG. 1), and the number of poles. The shape of the quadrature signal, which is a true signature of the back EMF induced in main winding 20, is influenced by rotor skew, magnet asymmetries and lamination design. Other means including Hall sensors, slotted disks with opto interrupters, and the like may also provide rotor position feedback for motor 300 instead of or in addition to quadrature winding 23. For example, Hall sensors provide a rotor feedback signal which is typically in phase with the back EMF in main winding 20. However, as described above, Hall sensors require more connectors than quadrature winding 23 which is undesirable in certain applications. To optimize commutation of motor 300, such position feedback means typically require precise control of positioning tolerances and accurate measurements.

In a preferred embodiment of the present invention, quadrature winding 23 (see FIG. 16) comprises a multiple-turn coil. For example, quadrature winding 23 comprises a six-turn winding coil for twelve stator poles. In the case of a multiple-turn coil, the voltage induced in quadrature winding 23 is the summation of the individual voltages induced in each single turn of winding 23. By summing the individual voltages, the quadrature winding signal accommodates for differences from coil to coil in the voltages sensed in individual coils due to, for example, magnet irregularities.

As described above, the zero crossings of the back EMF in quadrature winding 23 provide information regarding the zero crossings of the back EMF in winding 20. Commutation estimator circuit 324 (see FIG. 15) preferably determines the position of rotor 10 as a function of the zero crossings of the quadrature winding signal and generates commutation signals in response thereto. Torque production in motor 300 is then determined by the product of the current and the back EMF in winding 20. In order to sustain positive torque, commutation estimator circuit 324 commutates winding 20 at an angular distance prior to the zero crossing of the back EMF wave in the direction that will oppose the voltage energizing it. With the correct angular distance, current in winding 20 reaches zero at the time that the back EMF also reaches zero.

A shunt resistor, current transformer, Hall-effect current sensor, integrated current sensor or other sensor or circuit known in the art may be used to sense the winding or motoring current of motor 300. As illustrated in FIG. 13, inverter bridge 302 includes a single resistive shunt $R_{SHUNT}$ in the negative rail 314. Only the motor current flows through the shunt resistor $R_{SHUNT}$ when power is being exchanged from supply $V_S$ to motor 300 and vice versa.

Figure 14:
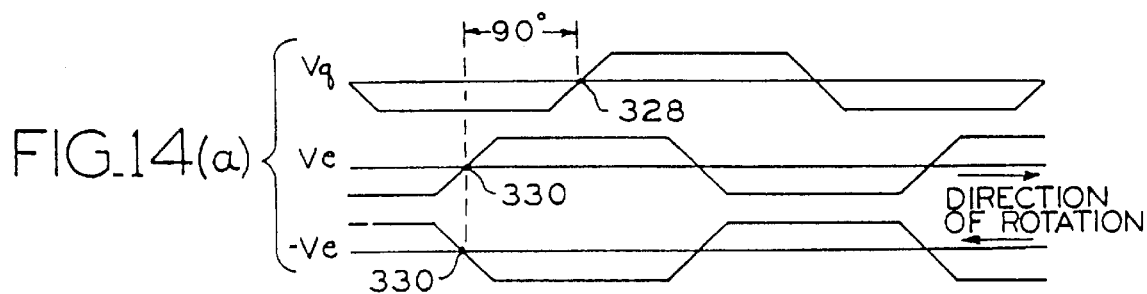
FIG. 14 is a set of exemplary timing diagrams illustrating the relationship between the back EMF and quadrature signals of the motor of FIG. 1g and a preferred commutation strategy of the invention.
Figure 14A:
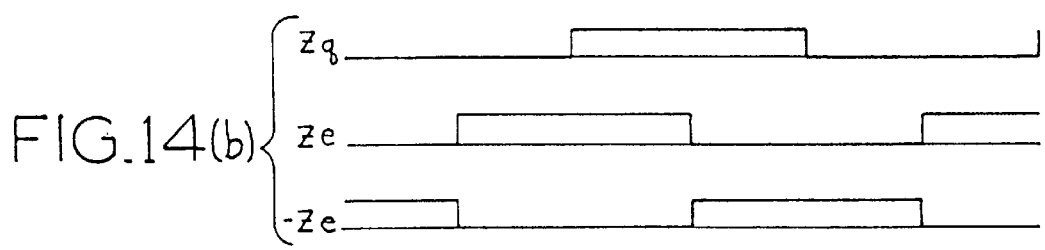
Figure 14B:
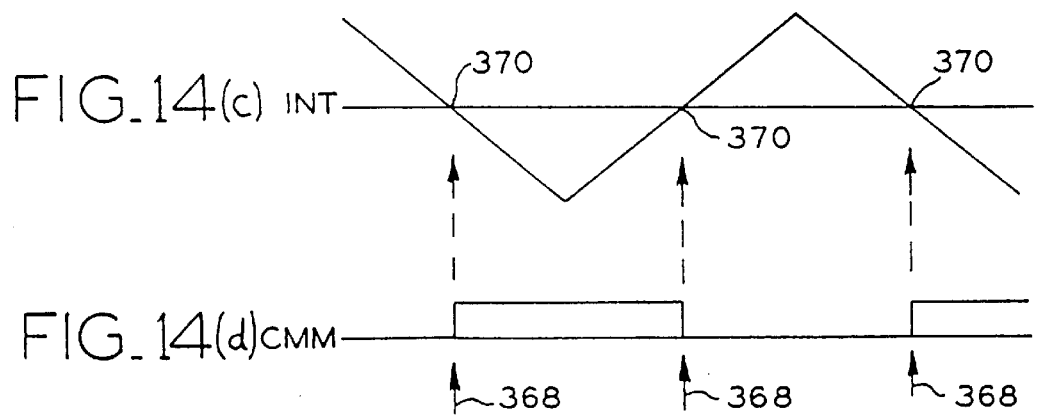

FIG. 14 illustrates exemplary waveforms of the signals processed by commutation estimator circuit 324 with respect to time. FIG. 14(a) shows the idealized voltage in quadrature winding 23 (i.e., $V_q$). FIG. 14(a) also shows the idealized back EMF waveform (i.e., $V_e$ or $-V_e$ depending on the direction of rotation) in main winding 20. Observed from quadrature winding 23, the voltage induced in the torque producing coil (i.e., main winding 20) is shown for different directions of rotation. As described above, quadrature axis winding 23 is preferably positioned approximately 90° out-of-phase from main winding 20. Thus, the phase difference between the two signals is approximately 90°. As an example, the 90° phase difference is indicated in FIG. 14(a) as the difference between a zero crossing 328 on the $V_q$ waveform and zero crossings 330 on the $\pm V_e$ waveforms. FIG. 14(b) shows the digital representations of the quadrature and direct coil signals, referred to as $Z_q$ and $\pm Z_e$. For example, the digital representation $Z_q$ of the quadrature winding signal $V_q$ is obtained by detecting the zero crossing of the waveform using a comparator (see FIG. 15).

Since back EMF signals are generated only when rotor 10 is moving, position information is not available when motor 300 is at standstill. Thus, in a preferred embodiment, motor 300 initially operates according to a starting algorithm. For example, inverter bridge 302 (see FIG. 16) applies current to motor winding 20 by turning on one pair of switches on opposite legs of inverter bridge 302. In the case of split capacitor topology, such as shown in FIG. 7, one switch is turned on. As a result of the current applied to winding 20, motor 300 generates torque in either direction of rotation and rotor 10 starts moving. As soon as rotor 10 moves, voltage is induced in quadrature winding 23 and the digital representation of this signal (i.e., $Z_q$) is available for processing.

Figure 15:
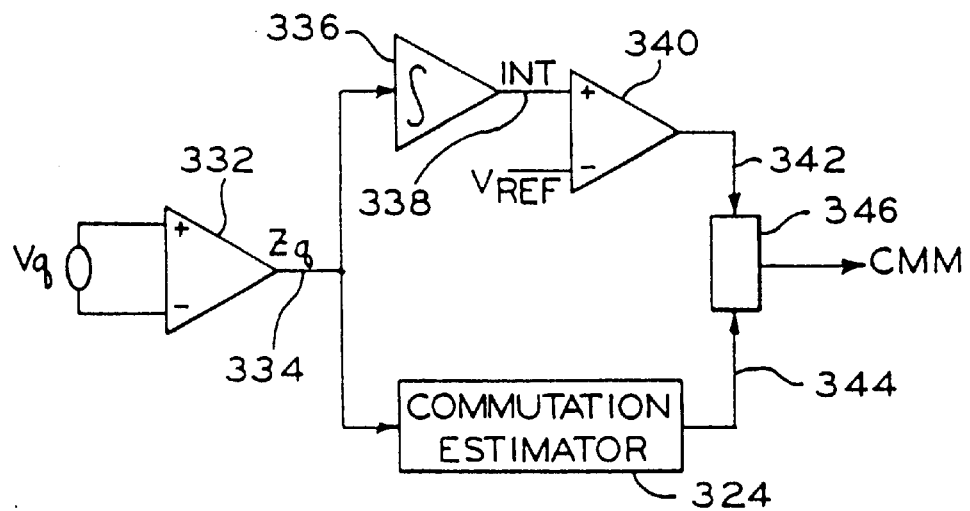
FIG. 15 is a block diagram of a preferred quadrature signal processing circuit according to the invention.

Once rotor 10 is moving, however, commutation is preferably synchronized to the quadrature signal $V_q$. FIG. 15 shows a block diagram of a preferred circuit for processing the quadrature winding signal $V_q$ during start-up and running conditions. According to this embodiment of the invention, a zero crossing comparator 332 first generates the signal $Z_q$ at line 334. After rotor 10 begins moving during start-up, an integrator 336 (see FIG. 15) integrates the digital quadrature winding signal $Z_q$ and outputs a signal INT via line 338 representative of the integration. Following integration, a comparator 340 compares the integrated signal INT to a reference level $V_{REF}$. As a result of the comparison, comparator 340 provides a commutation signal via line 342 for commutating motor 300. On the other hand, commutation estimator circuit 324 outputs commutation signals via line 344 to commutate winding 20 during running conditions.

A selector 346 outputs either the signal via line 342 from the integrator 336 and comparator 340 or the signal via line 344 from commutation estimator circuit 324 to commutate motor winding 20. In a preferred embodiment, the selector 346 comprises a switch responsive to the speed of rotor 10 for selecting between the commutation signal via line 342 from comparator 340 when the speed of rotor 10 is less than a threshold speed (e.g., 120 rpm) or the signal via line 344 from commutation estimator circuit 324 when the speed of rotor 10 reaches the threshold speed. In other words, after reaching the threshold speed, the start-up procedure concludes and selector 346 switches control to commutation estimator circuit 324. In the event rotor 10 has not reached the threshold starting speed, inverter bridge 302 may be force-commutated at a certain speed (e.g., 40 rpm).

As described above, commutation estimator circuit 324 may be embodied as a microcontroller. In a preferred embodiment, the microcontroller monitors the speed of rotor 10 by measuring the time interval between commutation instances. As an example, for a twelve-pole motor with 180° conduction intervals, twelve commutation instances occur for every mechanical revolution of the rotor. The number of commutations per mechanical revolution varies with the number of rotor poles. The length of the conduction interval could be less than 180° in certain applications (see FIG. 18). In this manner, the microcontroller is able to calculate the speed of motor 300 based on the time interval between commutations. In the alternative, it is to be understood that various other speed sensors or circuits may be used for detecting the speed of rotor 10.

Advantageously, the circuit of FIG. 15 provides a high level of noise immunity at low speeds where the amplitude of the quadrature signal $V_q$ is likely to be small and subject to noise. As speed of rotor 10 increases, the amplitude of the quadrature signal $V_q$ increases and provides well defined transitions at the zero crossings of the waveform. According to the invention, the circuit of FIG. 15 may be implemented in hardware using analog integration and a phase lock loop circuit. Alternatively, a microcontroller executes routines to perform the integration of the quadrature winding signal or to perform another starting algorithm as well as the estimation of the commutation instances. FIG. 16 illustrates a preferred motor drive circuit in schematic form which incorporates the features of the circuit of FIG. 15.

As shown in FIG. 16, a motor drive system according to the invention includes a user interface, or input and output interface I/O, which cooperates with a nonvolatile memory EE for providing system control signals to commutation estimator circuit 324, embodied as a microcontroller. In the illustrated embodiment, commutation estimator circuit 324 provides a commutation signal that includes two drive control signals, referred to as CMM1 and CMM2, via line 348 to a set of logic gates 350. The logic gates 350 output the commutation signals in the form of gate drive signals for electronically controlling a pair of upper gate drives 352, 354 and a pair of lower gate drives 356, 358. In turn, the gate drives 352, 354, 356, 358 provide enough signal conditioning to switch power switches 304, 306, 308, 310, respectively. In addition to providing voltage signals shifted from, for example, 5 volts to 15 volts for driving the power switches, gate drives 352, 354, 356, 358 also condition the signals provided from commutation estimator circuit 324 via line 348 for optimal operation of power switches 304, 306, 308, 310.

An AC to DC voltage converter 360 provides supply voltage $V_S$ (shown as +DC link and −DC link in FIG. 16) via a DC link (i.e., rails 312 and 314 of inverter bridge 302) to power switches 304, 306, 308, 310 for commutating a winding 20 of motor 300. The AC to DC voltage converter 360 also provides low voltage power (shown as low voltage sources $V_C$ and $V_D$ in FIG. 16) to operate commutation estimator circuit 324 and other circuitry of the motor drive system.

As described above, matching torque load with produced torque causes motor 300 to operate at a desired torque or speed. According to the invention, the motor drive system of FIG. 16 includes a current regulator circuit 362 for causing motor 300 to produce a peak current that matches the load torque demand as a function of a peak regulated current reference signal IREF. The current regulator circuit 362 converts the digital IREF signal to analog and compares it to the sensed current in the DC link. Then, as a function of a pulse width modulation frequency signal fPWM, current regulator circuit 362 outputs a PWM signal to the logic gates 350 which is a function of the peak regulated current. In this manner, current regulator circuit 362, in cooperation with commutation estimator circuit 324, regulates current in motor 300.

In a preferred embodiment of the invention, the motor drive system also includes an overcurrent detector circuit 364 for independently comparing the sensed current to a maximum current reference shown as ITRIP*. The maximum current reference is, for example, 20–50% greater than the peak regulated current level. Preferably, the maximum current reference is fixed according to the power limitations of power switches 304, 306, 308, 310 and/or motor 300. According to the invention, overcurrent detector circuit 364 compares the sensed current in the DC link to the maximum current reference and generates an overcurrent signal ITRIP when the sensed current exceeds the maximum current reference. In turn, commutation estimator circuit 324 receives the ITRIP signal and sets the state machine of the microcontroller accordingly to disable power switches 304, 306, 308, 310 and disconnect winding 20 from the supply $V_S$.

FIG. 16 also illustrates a current zero crossing comparator circuit 366 for generating a signal $I_{zero}$ representative of the zero crossings of the current sensed in the DC link. A signal IZREF provides a reference for the zero current detector $I_{zero}$. Preferably, its level is set slightly greater than zero.

Referring again to FIG. 14, FIG. 14(c) illustrates the integral of signal $Z_q$ (i.e., the digital representation of the quadrature coil voltage), INT, on integrator 336 via line 338. In this approach, the amplitude of $Z_q$ is independent of motor speed. FIG. 14(d) illustrates an exemplary commutation signal CMM, which is a function of the integrated signal INT, for causing commutation in motor 300. In this case, the advance angle is zero and integrator 336 provides 90° delay from the quadrature coil signal. Commutation instances 368 coincide with the zero crossings of the torque producing coil voltage, indicated at reference character 330 on the $V_e$ and $-V_e$ waveform, for example. This allows maximum accelerating torque at low speeds. Integrator 336, as shown in FIG. 15, is used from start-up to a threshold speed.

Further to the invention, commutation estimator circuit 324 determines preferred commutation instances for optimizing the performance of motor 300. As stated above, motor winding 20 must be energized at a proper instant of time relative to the generated back EMF to develop optimum motoring torque in motor 300. FIG. 14(d) shows commutation instances 368 which coincide with the zero crossings of the torque producing coil, or direct coil, voltage ($Z_e$, $-Z_e$). However, due to the inductive nature of motor 300, which is driven by a voltage source inverter such as inverter bridge 302, the motor current takes a finite time to reach a desired current level and to decay toward zero from a determined current level. Thus, motor current must be commutated in anticipation of the transition of the back EMF waveform in order for motor current to actually cross zero at the time the motor back EMF also crosses zero.

Commutation estimator circuit 324 preferably provides further optimization of motor 300 by causing the actual commutation instances to occur before motor back EMF crosses zero. By commutating motor 300 before motor back EMF crosses zero, the motor inductive current is allowed to decay while the back EMF also approaches zero. This allows the fundamental components of motor current to be in phase with the generated back EMF which maximizes torque production. In other words, motor 300 preferably achieves a unity power factor.

According to a preferred embodiment of the present invention, commutation estimator circuit 324 estimates a commutation angle in terms of the inductance of motor 300, the supply voltage $V_S$, the commanded motor current, and the speed of rotor 10. Commutation estimator circuit 324 further tunes the estimated angle for maximum torque production by observing the zero crossings of the motor current and synchronizing the zero crossings of the current with the zero crossings of the back EMF. This approach is valid for steady state operation.

An open loop equation for determining the commutation angle according to the invention may be derived using a simplified motor voltage equation. Neglecting the winding resistance and assuming that the motor back EMF in the vicinity of a commutation instance is close to zero, the following equation is the voltage across motor winding 20:

$$V_S = L\frac{di}{dt}$$

Expressing the above equation in terms of a rotating speed, ω, and solving for an angular distance:

$$V_S = L \frac{di}{d\theta} * \frac{d\theta}{dt}$$

$$d\theta = L * \frac{\frac{d\theta}{dt} * di}{V_S}$$

$$\theta = \frac{L * \omega * I_{PEAK}}{V_S}$$

where θ is the angle it takes for the current to decay towards zero, ω is the rotor speed, $I_{PEAK}$ is the peak commanded current before the commutation, L is the motor inductance, and $V_S$ is the voltage across winding 20. This simplified equation for θ sets a first order approximation for the advance angle but does not require extensive computation power as the complete equation would. It is to be understood that the above equation may be modified so as to calculate an advance time interval rather than an angle because of the relationship between motor speed and angular distance.

Another way to effect an advance angle for commutating motor winding 20 is by adaptive delaying of the integrator signal INT. A variable delay circuit (not shown) following integrator 332 accommodates the start and running commutation angle requirements over the entire speed range.

FIG. 17 illustrates exemplary waveforms for motor 300 with respect to time in which the advance angle θ is calculated according to the equation described above. FIG. 17(a) shows the idealized direct back EMF waveform $V_e$ relative to the idealized quadrature back EMF waveform $V_q$. FIG. 17(b) shows the digital signals $Z_q$ and $Z_e$ representing the zero crossings of the quadrature and back EMF signals, respectively. According to a preferred embodiment of the invention, the microcomputer embodying commutation estimator circuit 324 generates the digital signal $Z_e$ by first measuring the interval between zero crossings of the quadrature winding signal. In the illustrated embodiment, quadrature winding 23 is preferably 90° out-of-phase with main winding 20 which usually conducts in 180° intervals. For this reason, the zero crossings of the motor back EMF may be calculated by dividing the interval between zero crossings of the quadrature signal by two. FIG. 17(b) indicates a quadrature signal zero crossing by reference character 372 followed by another quadrature signal zero crossing indicated by reference character 374. The microcomputer first measures the interval T between the zero crossings 372, 374 and then estimates that the next zero crossing of the motor back, indicated by reference character 376, will follow by an interval T/2.

FIG. 17(c) shows an exemplary commutation signal CMM generated by commutation estimator circuit 324. As indicated by reference characters 378 and 380, commutation preferably occurs at the angle θ in anticipation of the back EMF zero crossings 382 and 376, respectively. FIG. 17(d) illustrates the motor current $I_M$ relative to the commutation and back EMF signals and FIG. 17(e) illustrates the current detected at the DC link shunt $R_{SHUNT}$ (see FIG. 16), i.e., $I_{shunt}$. In this instance, the current in the shunt is the current being exchanged between supply $V_S$ and motor winding 20. The intervals in which $I_{shunt}$ is zero correspond to pulse width modulation off intervals when motor current $I_M$ is decaying while circulating in motor winding 20 and inverter bridge 302. When winding 20 is commutated, $I_{shunt}$ has an opposite polarity (e.g., as shown at reference character 384) indicating the current flow from winding 20 to supply $V_S$.

As shown in FIG. 17(d), beginning at reference character 386, the motor current $I_M$ starts to decay toward zero immediately following the commutation instance 378 and crosses zero at reference character 388. Likewise, beginning at reference character 390, the motor current $I_M$ starts to decay toward zero immediately following the commutation instance 380 and crosses zero at reference character 392. Advantageously, commutation estimator circuit 324 provides further tuning of the estimated angle for maximum torque production by observing the zero crossings of the motor current during steady state operation and synchronizing them with the zero crossings of the back EMF.

Comparator circuit 366 is used to detect the zero crossings of shunt current $I_{shunt}$ to determine the zero crossings of the motor current $I_M$. The waveform of FIG. 17(f) represents the output $I_{zero}$ of such a comparator. As described above, commutation estimator circuit 324 preferably causes commutation in motor 300 to occur so that the fundamental components of motor current are in phase with the generated back EMF to maximize torque production. By comparing the signal $I_{zero}$ to the estimated zero crossing signal $Z_e$, commutation estimator circuit 324 determines the relative displacement between the back EMF and the current zero crossings. Although the commutation instance 378 does not yet provide optimum torque, as indicated by the displacement δ, the information of the relative displacement between the back EMF and the current zero crossing provided by signal $I_{zero}$ allows the commutation angle to be adjusted to minimize this displacement. For example, the transition of $I_{zero}$ shown at reference character 394, which corresponds to the current zero crossing 388, occurs before the back EMF zero crossing 382, indicating a negative displacement δ. The angular difference between the time inductive current decays to zero and the time the back EMF crosses zero must be minimized for optimal commutation. During steady state operation, commutation estimator circuit 324 observes this difference and adjusts, or fine tunes, the advance angle to minimize the displacement δ. In this instance, commutation estimator circuit 324 decreases the advance angle (e.g., $\theta_1$). As a result of the adjustment, the transition of $I_{zero}$ shown at reference character 396, which corresponds to the current zero crossing 392, coincides with the voltage zero crossing 376. Thus, torque production in motor 300 is optimized. When angular displacement δ is greater than a minimum angle and inverter bridge 302 is enabled for 180° conduction intervals, negative torque is produced by motor 300. This negative torque reduces the motoring torque and could generate audible noise.

Alternatively, the circuit of FIG. 16, which includes a commutation signal comprised of two control signals (i.e., CMM1 and CMM2), can be commanded to operate at conduction intervals less than 180°. Motor conduction angles less than 180° reduces torque production and can be used for torque control whenever optimal operation is not required. With this scheme, an interval of zero current "dead time" is inserted after the motor current is commutated and has reached zero. The use of dead time is beneficial in preventing the generation of negative torque when rapid acceleration or deceleration is required and the estimation of the back EMF is subject to errors.

FIG. 18 illustrates exemplary waveforms for motor 300 with respect to time in which the conduction intervals are less than 180°. FIG. 18(a) shows the idealized direct back EMF waveform $V_e$ relative to the idealized quadrature back EMF waveform $V_q$. FIG. 18(b) shows the digital signals $Z_q$ and $Z_e$ representing the zero crossings of the quadrature and back EMF signals, respectively. FIG. 18(c) shows a pair of exemplary control signals CMM1 and CMM2 constituting the commutation signal generated by commutation estimator circuit 324. As indicated by reference characters 398 and 400, commutation preferably occurs at the angle θ₁ and the angle θ₂ in anticipation of back EMF zero crossings 402 and 404, respectively. FIG. 18(d) illustrates the motor current $I_M$ relative to the commutation and back EMF signals and FIG. 18(e) illustrates the current detected at the DC link shunt $R_{SHUNT}$ (see FIG. 16), i.e., $I_{shunt}$. As shown in FIGS. 18(d) and 18(e), commutating main winding for less than 180° causes a dead time in the current. The dead time is shown by, for example, an off interval 406. As shown in FIG. 18(d), beginning at reference character 408, the motor current $I_M$ starts to decay toward zero immediately following the commutation instance 398. After reaching zero, the current is off for the off interval 406 until the next commutation at reference character 410. Likewise, beginning at reference character 412, the motor current $I_M$ starts to decay toward zero immediately following the commutation instance 400. Again, after reaching zero, the current is off for the off interval 406 until the next commutation at reference character 414. Thus, as shown in FIGS. 18(d) and 18(e), the current waveforms have intervals of no current due to the conduction intervals being less than 180°. Note that the motor current decays to zero and remains at zero twice every electrical cycle.

In view of the above, it will be seen that the several objects of the invention are achieved and other advantageous results attained.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A motor comprising:
    a rotor;
    a stator;
    a position sensor for generating an output signal representative of rotor angular position, said output signal having an angular relationship with back electromotive force (EMF) generated by a main winding of the stator; and
    a commutation estimator circuit responsive to the output signal generated by the position sensor for estimating zero crossings of the back EMF in the main winding and generating a commutation signal to commutate the main winding of the stator in advance of the estimated zero crossings of the back EMF by an angle θ calculated by the following:

$$\theta = \frac{L * \omega * I_{PEAK}}{V_S}$$

where ω is the speed of the rotor, $I_{PEAK}$ is a peak current in the main winding corresponding to a desired speed and/or torque of the motor, L is the motor inductance in the main winding, and $V_S$ is the voltage across the main winding.

2. The motor of claim 1, wherein the position sensor comprises a quadrature axis winding positioned out-of-phase from the main winding of the stator and the output signal is representative of voltage induced in the quadrature axis winding.

3. The motor of claim 1, wherein the output signal generated by the quadrature axis winding is approximately 90° out-of-phase with the back EMF generated by the main winding.

4. The motor of claim 1 further comprising a zero crossing detector for detecting zero crossings of current in the main winding and wherein the commutation estimator circuit adjusts the angle θ to minimize the difference between the detected zero crossings of the current and the estimated zero crossings of the back EMF thereby optimizing torque production of the motor.

5. The motor of claim 1 wherein the main winding is commutated in response to the commutation signal in two conduction intervals per 360° cycle in which the current in the main winding is in one direction during one of the conduction intervals per cycle and in the opposite direction during the other of the conduction intervals per cycle, and wherein each of said conduction intervals is less than 180°.

6. The motor of claim 5 wherein the commutation signal includes an off interval between successive conduction intervals wherein the current in the main winding decays to zero during the off interval.

7. A method of starting a single phase permanent magnet motor including a rotor and a stator and a quadrature axis winding positioned for generating an output signal representative of rotor angular position, the method comprising the steps of:
    applying direct current to a main winding of the stator for a length of time sufficient to momentarily align the rotor with the stator;
    applying no current to the main winding for a length of time sufficient for the rotor to return to a position in which a starting direction of the rotor is known; and
    commutating current to the main winding while obtaining a commutation signal from the quadrature axis winding.

8. A method of starting a single phase permanent magnet motor including a rotor, a stator, and a quadrature axis winding positioned for generating an output signal representative of rotor angular position, the method comprising the steps of:
    applying direct current to a main winding of the stator for a length of time sufficient to cause the rotor to begin to rotate; and then
    commutating current to the main winding while obtaining a commutation signal from the quadrature axis winding.

9. A method of starting a single phase permanent magnet motor including a rotor, a stator, and a quadrature axis winding positioned for generating an output signal representative of rotor angular position, the method comprising the steps of:
    applying direct current to a main winding of the stator for a length of time sufficient to momentarily align the rotor with the stator;
    applying no current to the main winding for a length of time sufficient for the rotor to return to a position in which a starting direction of the rotor is known;
    applying direct current to the main winding of the stator for a length of time sufficient to cause the rotor to begin to rotate; and then
    commutating current to the main winding while obtaining a commutation signal from the quadrature axis winding.

10. A method of operating a single phase motor including a rotor and a stator and a position sensor generating an output signal representative of rotor angular position, said output signal having an angular relationship with back electromotive force (EMF) generated by a main winding of the stator, said method comprising the steps of:

estimating zero crossings of the back EMF in the main winding as a function of the output signal generated by the position sensor;

generating a commutation signal in advance of the estimated zero crossings of the back EMF by an angle θ calculated by the following:

$$\theta = \frac{L * \omega * I_{PEAK}}{V_S}$$

where ω is the speed of the rotor, $I_{PEAK}$ is a peak current in the main winding corresponding to a desired speed and/or torque of the motor, L is the motor inductance in the main winding, and $V_S$ is the voltage across the main winding; and commutating current to the main winding in response to the commutation signal.

11. The method of claim 10 further comprising the steps of detecting zero crossings of the current in the main winding and adjusting the angle θ to minimize the difference between the detected zero crossings of the current and the estimated zero crossings of the back EMF thereby optimizing torque production of the motor.

12. The method of claim 10 wherein the commutating step comprises commutating the current to the main winding in two conduction intervals per 360° cycle in which the current in the main winding is in one direction during one of the conduction intervals per cycle and in the opposite direction during the other of the conduction intervals per cycle, and wherein each of said conduction intervals is less than 180°.

13. The method of claim 12 wherein the step of generating the commutation signal comprises providing an off interval between successive conduction intervals wherein the current in the main winding decays to zero during the off interval.

14. A method of operating a single phase motor including a rotor and a stator and a position sensor generating an output signal representative of rotor angular position, said output signal having an angular relationship with back electromotive force (EMF) generated by a main winding of the stator, said method comprising the steps of:

applying direct current to the main winding of the stator for a length of time sufficient to cause the rotor to begin to rotate;

integrating the output signal generated by the position sensor;

generating a first commutation signal as a function of the integrated output signal;

estimating zero crossings of the back EMF in the main winding as a function of the output signal generated by the position sensor;

generating a second commutation signal in advance of the estimated zero crossings of the back EMF by an angle θ calculated by the following:

$$\theta = \frac{L * \omega * I_{PEAK}}{V_S}$$

where ω is the speed of the rotor, $I_{PEAK}$ is a peak current in the main winding corresponding to a desired speed and/or torque of the motor, L is the motor inductance in the main winding, and $V_S$ is the voltage across the main winding;

commutating current to the main winding in response to the first commutation signal when the speed of the rotor is less than a threshold speed; and commutating current to the main winding in response to the second commutation signal when the speed of the rotor is greater than or equal to the threshold speed.

* * * * *